US006301219B1

(12) United States Patent
Kondo et al.

(10) Patent No.: US 6,301,219 B1
(45) Date of Patent: Oct. 9, 2001

(54) DEVICE OF LOADING RECORDING MEDIUM

(75) Inventors: Takashi Kondo, Nagano; Yasuo Osada, Saitama; Shinji Ito, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/077,871

(22) PCT Filed: Oct. 9, 1997

(86) PCT No.: PCT/JP97/03654

§ 371 Date: Nov. 6, 1998

§ 102(e) Date: Nov. 6, 1998

(87) PCT Pub. No.: WO98/15954

PCT Pub. Date: Apr. 16, 1998

(30) Foreign Application Priority Data

Oct. 9, 1996 (JP) .................................................... 8-268939
Oct. 19, 1996 (JP) .................................................... 8-297170

(51) Int. Cl.⁷ .................................................. G11B 17/10
(52) U.S. Cl. ......................................................... 369/191
(58) Field of Search ........................... 369/191, 36, 75.1, 369/75.2, 178, 179

(56) References Cited

U.S. PATENT DOCUMENTS

| | | | |
|---|---|---|---|
| 5,226,032 | * | 7/1993 | Ikedo et al. .......................... 369/178 |
| 5,504,729 | * | 4/1996 | Ikedo et al. .......................... 369/75.1 |
| 5,587,973 | * | 12/1996 | Kanazawa et al. ..................... 369/13 |
| 5,689,490 | * | 11/1997 | Pollard ................................. 369/77.2 |
| 5,805,562 | * | 9/1998 | Hisatomi .............................. 369/191 |
| 5,844,880 | * | 12/1998 | Motoki et al. ........................ 369/191 |
| 6,058,080 | * | 5/2000 | Masuda ................................. 369/36 |

* cited by examiner

*Primary Examiner*—David L. Ometz
*Assistant Examiner*—Angel Castro
(74) *Attorney, Agent, or Firm*—Jay H. Maioli

(57) ABSTRACT

A loading apparatus for a disc, in which a transporting member carrying a disc is moved across the inside and the outside of a main body portion of the apparatus for transporting the disc between a disc exchanging position protruded from the main body portion, a disc housing position, within the main body portion and a recording and/or reproducing position includes a plurality of transporting members arranged in a stacked state in a main body portion of the apparatus and adapted for movement between a position protruded from the main body portion and a position within the main body portion. Each of the transporting members carries a recording medium. The loading apparatus also includes a movement mechanism having a driving source, a first driving unit to which driving power from the driving source is perpetually transmitted, and a second driving unit for selectively transmitting the driving power from the first driving unit to the transporting members for moving one of the transporting members between the protruded position and the position within the main body portion. The loading apparatus selectively transports one of the transporting members.

22 Claims, 23 Drawing Sheets

DEVICE OF LOADING RECORDING MEDIUM

TECHNICAL FIELD

This invention relates to a loading apparatus for loading a recording medium, such as an optical disc having information signals recorded thereon. More particularly, it relates to a loading apparatus for feeding a recording medium across the inside and the outside of a main body portion of the apparatus for effectuating the loading.

BACKGROUND ART

Up to now, a disc player has been in use, in which an optical disc having information signals, such as audio signals, recorded thereon, is used as a recording medium. This type of the disc player in widespread use houses only a sole optical disc in the main body portion of the apparatus and is designed to reproduce only this optical disc. This disc player has a disc tray moved in the horizontal direction across the inside and the outside of the main body portion of the device for loading the optical disc. This disc tray is moved by a movement mechanism between a position of insertion/ejection of the optical disc pulled to outside of the main body portion of the device and a reproducing position inside the main body portion of the device. When the disc tray is moved to the reproducing position, a disc reproducing unit is moved to approach the disc tray. By the disc reproducing unit approaching the disc tray, an optical disc held on the disc tray is loaded on a disc rotating actuating mechanism for reproducing information signals, such as audio signals recorded on the optical disc.

With such disc player, attempts are being made for reducing the size of the device for improving the spatial efficiency of the mounting space. Ideally, the diameter of the main body portion of the disc player is equal to that of the optical disc accommodated therein. With the disc player, a disc tray for moving the optical disc into and outwardly from the main body portion of the disc player, a movement mechanism for moving the disc tray into and outwardly from the main body portion of the disc player, and a disc driving mechanism for rotationally driving the optical disc need to be provided within the main body portion. Thus it is difficult to reduce the size of the disc player to a size approximately equal to the diameter of the optical disc.

On the other hand, for enabling continuous reproduction of an optical disc, such a disc player is used having plural optical discs housed within its main body portion and having the disc exchanging function of selectively reproducing these optical discs. In this type of the disc player, a number of disc trays, adapted for being moved horizontally into and out of the main body portion of the device are stacked in plural tiers in the vertical direction perpendicular to the movement direction. This type of the disc player needs to be provided with a movement mechanism for horizontally moving the disc trays across the inside and the outside of the main body portion of the device and a selection mechanism for selecting the disc trays. This renders it still more difficult to reduce the size of the disc player than in the case of the disc player adapted for housing, holding and reproducing the sole optical disc.

In the disc player housing plural optical discs, it is necessary to be able to move the disc reproducing unit in the up-and-down direction relative to the arraying direction of the plural disc trays for enabling the optical discs held on the selected disc tray to be run in rotation. To this end, it is necessary to be able to detect the position of the disc reproducing device along its height. Moreover, since the disc tray is moved between the outwardly extracted position enabling disc exchange and the reproducing position in the main body portion of the player, as described above, it is also necessary to detect the disc tray position. If the positions of the disc reproducing unit and the disc tray are detected in this manner, the operability of the entire device tends to be worsened.

The disc recording and/or reproducing apparatus, inclusive of the disc player, tends to be subjected to vibrations under the shock applied from outside during use or transport. The disc driving unit of the disc recording and/or reproducing apparatus is heavier in weight due to the provision of the driving motor for driving the disc or of the optical pickup device as the recording and/or reproducing unit. If a shock is applied to the main body portion of the apparatus, the transporting mechanism for transporting the disc driving unit to the reproducing position tends to be damaged.

In particular, in the disc recording and/or reproducing apparatus having plural disc trays in tiers, the disc driving unit needs to be raised or lowered by a transport mechanism to the position of the disc tray holding the optical disc selected by the user. This transport mechanism needs to have the function of transporting the disc driving unit a height corresponding to the stacked height of the disc trays. This correspondingly complicates the structure of the transport mechanism. If a shock is applied to the disc recording and/or reproducing apparatus, the apparatus tends to be damaged. If, with the optical disc loaded on the disc driving unit, the disc recording and/or reproducing apparatus is in disorder, it becomes occasionally impossible to unload the optical disc from the main body portion of the apparatus.

The disc tray for moving the optical disc provided in the disc recording and/or reproducing apparatus into and out of the main body portion of the apparatus has a disc setting portion on its surface for setting the loaded optical disc thereon. Since the disc tray is formed on its both lateral sides parallel to its movement direction with ribs engaged in guide grooves formed in the sidewall sections of the main body portion of the apparatus, the disc tray width becomes larger than the disc diameter to render it difficult to reduce the width and size of the entire apparatus.

Thus, for reducing the size of the apparatus, such an apparatus is proposed in which the disc tray width is set so as to be slightly smaller than the optical disc diameter. With this disc tray, it is proposed to provide cut-outs on its both lateral sides parallel to the direction of movement and to have the outer rim exposed to outside via this cut-out.

With this disc tray, since the optical disc is partially exposed to outside via this cut-out, it becomes impossible to positively protect the optical disc held thereon. If the disc recording and/or reproducing apparatus, having the disc tray, is tilted with the optical disc housed in its main body portion, the optical disc tends to be deviated on the disc setting portion of the disc tray. If the optical disc is deviated in the main body portion of the device, the disc tray is likely to be unable to be pulled out along with the disc. The optical disc, deviated from the disc tray, tends to be caught by the disc tray driving unit to obstruct the operation of the driving unit. For possibly evading this problem, the optical disc needs to be held on the disc tray such as to evade positional deviation in both the up-and-down direction and the horizontal direction.

The disc recording and/or reproducing apparatus, having plural disc trays moved in the horizontal direction across the inside and the outside of the main body portion of the apparatus, has plural openings on the front side of the main body portion of the apparatus via which to extract the disc trays to outside of the main body portion of the apparatus. The disc recording and/or reproducing apparatus is provided with a lid adapted for closing the openings when the disc tray is moved into the main body portion of the apparatus. This lid prevents foreign matter from being intruded into the main body portion of the apparatus via the opening kept open to protect the units provided in the main body portion of the apparatus.

The above openings are independently provided in the front side of the main body portion of the apparatus and are respectively associated with lids adapted for opening/closing the openings. If the openings and the lids adapted for opening/closing the openings are provided separately, it becomes difficult to provide the opening of a sufficient height to permit all of the disc trays to be protruded outwardly of the main body portion of the apparatus. In particular, the disc tray for moving the optical disc across the inside and the outside of the main body portion of the apparatus needs to be provided on its upper surface with a recessed disc setting portion in which to hold the optical disc of a constant thickness. Moreover, the disc tray is provided on its lateral surface with a rack gear adapted for meshing with a driving gear of the movement mechanism adapted for moving the disc tray. Thus it is impossible to reduce the disc tray thickness to less than a pre-set thickness. Thus, the disc tray thickness cannot be reduced to less than a certain value. For smoothly pulling out the disc tray outwardly of the main body portion of the apparatus, the opening needs to be of a pre-set height, so that, if the openings are provided separately, the disc player cannot be reduced in height.

Also, if the opening height is decreased, the lid height is reduced, so that, if the lid surface is used as a display surface, the display area is diminished to render it impossible to provide a sufficiently large display.

DISCLOSURE OF THE INVENTION

It is therefore an object of the present invention to provide a novel loading device for a recording medium capable of solving the above-mentioned problems.

It is another object of the present invention to provide a loading device for a recording medium capable of reducing the size of the device and of improving the operability.

It is a further object of the present invention to provide a loading device for a recording medium capable of detecting the position of a transporting member of a recording medium for enabling positive loading on the disc recording and/or reproducing function.

It is a further object of the present invention-to provide a loading device for a recording medium having plural transporting members which are stacked parallel to one another in the up-and-down direction perpendicular to the movement direction, for setting the recording medium thereon, and which are moved across the inside and the outside of the main body portion of the device, wherein the position of the recording and/or reproducing unit for the recording medium is detected for reliably controlling the loading position of the recording medium.

It is a further object of the present invention to provide a loading device for a recording medium in which the recording and/or reproducing unit for the recording medium can be fixed during the non-use time to enable protection of the recording and/or reproducing unit.

It is a further object of the present invention to provide a loading device for a recording medium in which the recording and/or reproducing unit for the recording medium is fixed during non-use time for enabling protection of the recording and/or reproducing unit.

It is a further object of the present invention to provide a loading device for a recording medium in which the recording medium can be reliably set on the disc setting portion of the transporting member for enabling protection of the recording and/or reproducing unit.

It is a further object of the present invention to provide a loading device for a recording medium which, if applied to a disc recording and/or reproducing apparatus having plural recording medium setting transporting members in tiers, the apparatus as such can be further reduced in size.

It is yet another object of the present invention to provide a loading device for a recording medium in which a lid adapted for opening/closing the aperture for pulling out the recording medium setting transporting member from the main body portion of the apparatus is of a sufficiently large size to protect the recording medium to enable the transporting member to be reliably moved into and out of the main body portion of the apparatus.

For accomplishing the above objects, the present invention provides a loading apparatus for a recording medium including a plurality of transporting members arranged in a stacked state in a main body portion of the apparatus and adapted for being moved between a position protruded from the main body portion and a position within the main body portion, and a movement mechanism having a driving source, a first driving unit to which the driving power from the driving source is perpetually transmitted, and a second driving unit for selectively transmitting the driving power from the first driving unit to the transporting members for moving one of the transporting members between the protruded position and the position within the main body portion. The transporting members each carries a recording medium.

The first driving unit includes a plurality of gear portions selectively engaged with the transporting members. The transporting members each has a mating engagement portion for engaging with the gear portion. The second driving unit includes a switching member for selectively engaging the gear portions of the first driving unit with the transporting members. The switching member has an operating portion for engaging one of the gear portions with one of the transporting members. The operating portion causes one of the gear portions to be moved into engagement with one of the transporting members.

The above-defined loading apparatus further includes a detection unit for detecting the position of the transporting members. The transporting members can be moved by the movement mechanism between the position protruded from the main body portion, the position within the main body portion and/or the recording and/or reproducing position based on the results of detection from the detection unit.

The above-defined loading apparatus further includes a recording and/or reproducing unit for recording and/or reproducing information signals to the recording medium transported by the transporting member and a lift mechanism for moving the recording and/or reproducing unit to a recording and/or reproducing position. The lift mechanism moves the recording and/or reproducing unit to the recording and/or reproducing position when the detection unit has detected the transporting member to be in the recording and/or reproducing position.

The above-defined loading apparatus further includes a clamp unit for clamping a recording medium transported by the transporting mechanism by the recording and/or reproducing unit moved to the recording and/or reproducing position. The clamp unit further moves the recording medium to the recording and/or reproducing position enabling its recording and/or reproduction. The movement mechanism includes a transmission switching unit for switchingly transmitting the driving power from the driving source to the first driving unit or to the clamp unit. The transmission switching unit includes a gear selectively engaged with the first driving unit or the clamp unit by being rotated by the driving power transmitted from the driving source.

The above-defined loading apparatus further includes a recording and/or reproducing unit for recording and/or reproducing information signals to a recording medium transported by the transporting member, a lift mechanism for moving the recording and/or reproducing unit to the recording and/or reproducing position and a holding unit for holding the recording and/or reproducing unit during off-time of a main power source of the apparatus at a position lowered by the lift mechanism. The recording and/or reproducing unit includes an engagement member moved during the main power source off-time. The holding unit has a stationary holding portion engageable with the engagement member moved during the main power source off-time.

The transporting member has a recess on which to set a recording medium and a first controlling portion for limiting movement of the recording medium set on the recess when the transporting member is moved towards the position within the main body portion. A second controlling portion is provided on a lateral surface of the main body portion for limiting the movement of the recording medium set on the recess in a direction perpendicular to the direction interconnecting the protruded position and the position within the main body portion.

The above-defined loading apparatus further includes a further controlling portion for being protruded from the top of the main body portion towards the recess in the transporting member for limiting movement of the recording medium set on the recess in the up-and-down direction of the recording medium.

The above-defined loading apparatus further includes a plurality of rectangular openings in the front surface of the main body portion in parallel with one another for permitting the transporting member to be moved to the protruded position, and a plurality of lids for opening/closing the openings. These lids are rotatable towards the lower side of the main body portion and arranged so that a portion of a given one of the lids is overlapped with a portion of an overlying one of the lids. Each of the lids is formed with an inclined surface at an overlapping portion thereof with the overlying lid. The above-defined loading apparatus further includes a biassing unit for biassing the lids in a direction of closing the openings.

The present invention also provides a loading apparatus for a recording medium including at least a transporting member on which a recording medium is set and which is moved between a position protruded from a main body portion of the apparatus and a position within the main body portion, and a movement mechanism for moving the transporting members between the protruded position and the position within the main body portion. The movement mechanism includes a driving source, a first driving portion to which the driving power is perpetually transmitted from the driving source, and a second driving portion for engaging the driving power from the first driving portion with the transporting member only when the transporting member is moved towards the protruded position or towards the position within the main body portion for moving the transporting member towards the protruded position or towards the position within the main body portion.

The present invention also provides a loading apparatus for a recording medium including a plurality of transporting members arranged in a stacked state in a main body portion of the apparatus and adapted for being moved between a position protruded from the main body portion and a position within the main body portion, a recording and/or reproducing unit for recording and/or reproducing information signals to the recording medium transported by one of the transporting members, a lift mechanism for moving the recording and/or reproducing unit to a recording and/or reproducing position and a holding unit for holding the recording and/or reproducing unit during the off-time of a main power source of the apparatus at the position lowered by the lift mechanism. Each of the transporting members carries a recording medium. The recording and/or reproducing unit includes an engagement member moved during the main power source off-time and the holding unit has a stationary holding portion engageable with the engagement member moved during the main power source off-time.

The transporting mechanism includes a movement mechanism for moving one of the transporting members between the protruded position and the position within the main body portion.

The above-defined loading apparatus further includes a detection unit for detecting the position of the transporting member. The transporting member can be moved by the movement mechanism between the protruded position and the position within the main body portion based on the results of detection by the detection unit. The lift mechanism moves the recording and/or reproducing unit to the recording and/or reproducing position if the detection unit detects the transporting member to be in the recording and/or reproducing position. The above-defined loading apparatus further includes a clamp unit for clamping a recording medium transported to the transporting mechanism by the recording and/or reproducing unit moved to the recording and/or reproducing position. The clamp unit further moves the recording medium to the recording and/or reproducing position enabling its recording and/or reproduction.

The present invention also includes a loading apparatus for a recording medium including a main body portion having a plurality of rectangular-shaped openings on a front surface thereof in parallel with one another, and a plurality of transporting members for the recording medium arranged in the main body portion in stacked state. The transporting members has the recording medium set thereon and is moved via the openings between a position protruded from the main body portion and a position within the main body portion. The loading apparatus also includes a plurality of lids for opening/closing the openings. These lids are rotatable to the lower side of the main body portion, and are arranged so that portions of a given one of the lids will be overlapped with portions of an overlying one of the lids.

The overlapping portions of the lids with the overlying lids are formed with inclined surfaces. The above-defined loading apparatus further includes a biassing unit for biassing the lids in the direction of closing the openings.

Other objects and advantages of the present invention will become more apparent from the following description of the preferred embodiments thereof.

BEST MODE FOR CARRYING OUT THE INVENTION

Figure 1:
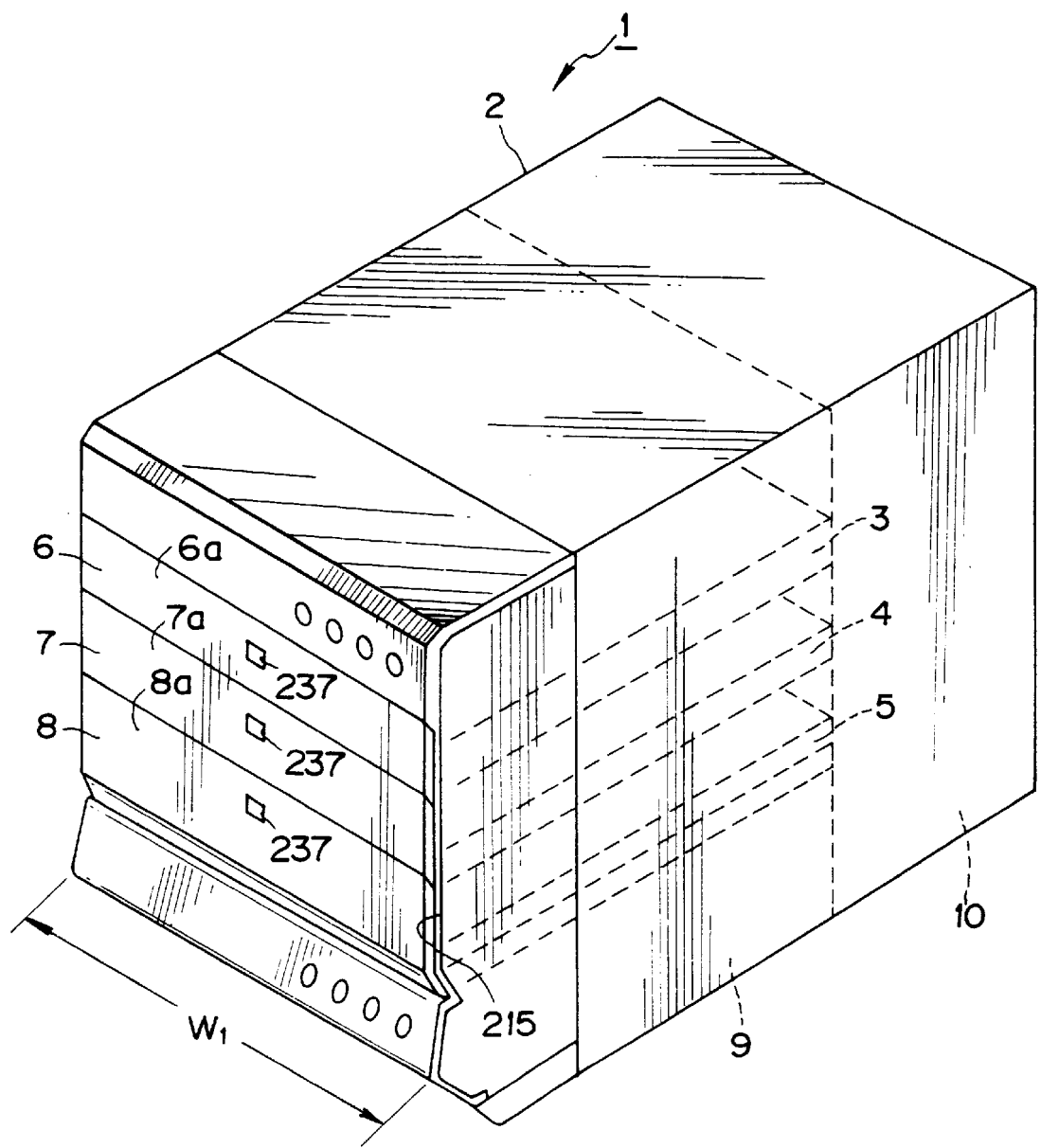
FIG. 1 is a perspective view of a disc player embodying the present invention.

Referring to the drawings, a preferred embodiment of a recording medium loading device according to the present invention will be explained in detail.

In the following embodiment, the present invention is applied to a disc player employing an optical disc 12 cm in diameter and an optical disc 8 cm in diameter, having recorded thereon information signals, such as audio signals, as recording mediums.

Referring to FIG. 1, a disc player 1 is generally parallelepiped in configuration, and has a width $W_1$ subsequently equal to the diameter of the optical disc. Within a main body portion 2 of this disc player 1, there are arranged first, second and third optical disc trays 3, 4 and 5, as recording medium transporting members adapted for holding the optical discs and for moving in this state across the inside and the outside frequency divider the main body portion 2. On the front side of the main body portion 2 are arranged lids 6, 7 and 8, in an array extending in the up-and-down direction, in association with the first, second and third optical disc trays 3, 4 and 5. These lids 6 to 8 are provided with rotational pivot points at the lower ends thereof so as to be rotated towards the lower side of the main body portion 2 with the rotational pivot points as center. These lids 6 to 8 are rotationally biassed at all times in a direction of closing the openings by a biassing member. The lids 6 to 7, respectively associated with the disc trays 3 to 5, are arranged for being partially overlapped with one another for enlarging the size of the lids 6 to 8 while reducing the size of the opening via which the disc trays 3 to 5 are protruded outwardly of the main body portion of the device 2.

On the lower side of the disc trays 3 to 5 towards the bottom within the main body portion of the device 2 is arranged a driving unit 9 of a lift mechanism configured for lifting or lowering a disc driving mechanism adapted for rotationally driving a disc tray and an optical disc. Towards the back side of the main body portion of the device 2, not fitted with the lids 6 to 8, there is mounted a disc reproducing unit 10 adapted for lifting and lowering the disc driving mechanism and for reproducing the optical disc.

Thus, with the disc player 1, the size of the entire device is reduced by arranging the lids 6 to 8 in a partially overlapped relation to one another for reducing the height of the device, by arranging the driving unit 9 on the bottom side below the disc trays 3 to 5 and by arranging the disc driving mechanism and the disc reproducing unit 10 on the back side of the main body portion of the device 2 lying inwardly of the disc trays 3 to 5.

Figure 2:
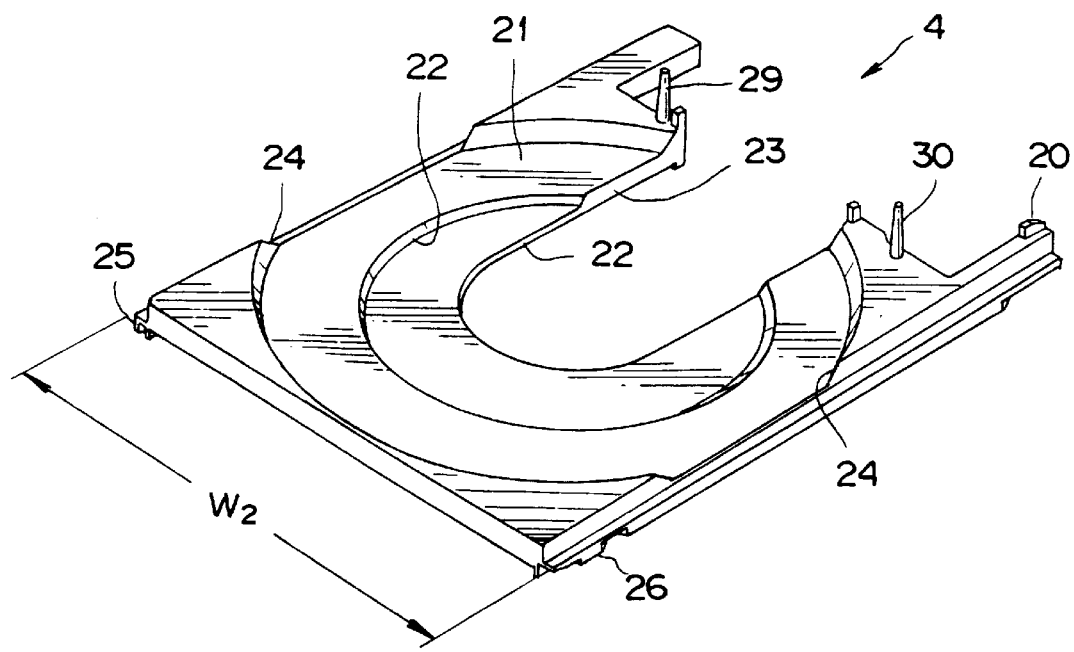
FIG. 2 is a perspective view of a disc tray used in the disc player shown in FIG. 1, looking from the upper surface side.
Figure 3:
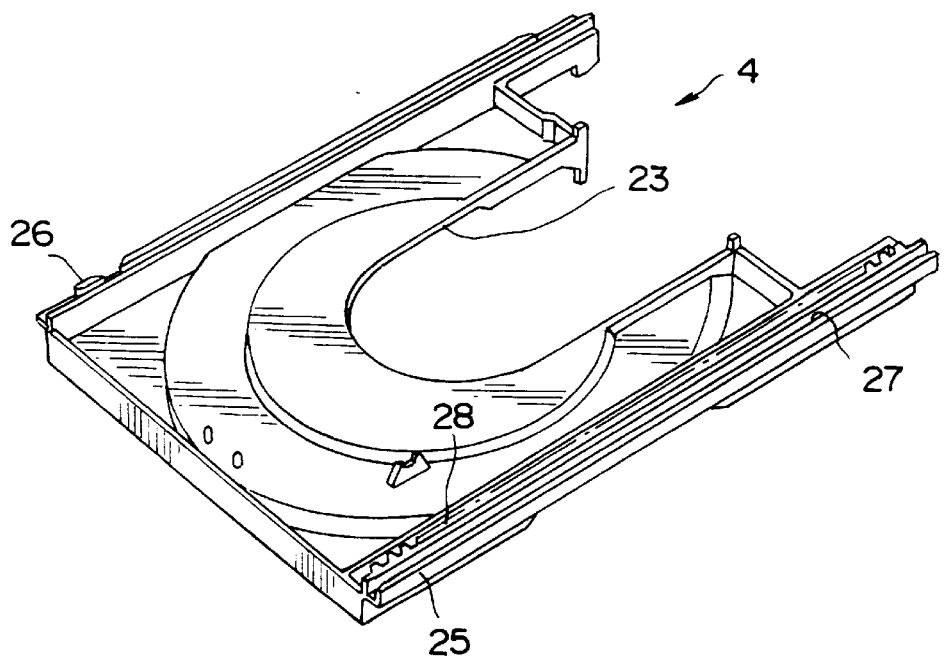
FIG. 3 is a perspective view of a disc tray used in the disc player shown in FIG. 1, looking from the lower surface side.

Referring to FIGS. 2 and 3, the first to third disc trays 3 to 5 are explained in detail. In the following, the second disc tray 4 is explained in detail, while the first and third disc trays 3 and 5 are not explained.

The second disc tray 4 is generally rectangular in profile and has a recessed first disc setting section 21 of subsequently the same diameter as the optical disc diameter which is 12 cm. In the bottom surface of the first disc setting section 21 is formed a recessed second disc setting section 22, concentric with the first disc setting section 21, for setting therein the optical disc with the diameter of 8 cm. The disc tray 3 is formed with an aperture 23 extending from its center as far as its lateral edge. In this aperture 23 are exposed a disc rotating and driving mechanism and an optical pickup device constituting a recording and/or reproducing mechanism when an optical disc is set on the disc tray 4 for reproducing audio signals. The disc tray 4 has a width $W_2$ slightly smaller than the optical disc with the diameter of 12 cm, and has cut-outs 24 on opposite facing sides thereof. Thus, when the optical disc with the diameter of 12 cm is set on this first disc setting section 21, part of the rim of the optical disc is protruded via these cut-outs 24. Thus, the first to third disc trays 3 to 5 are reduced in size by being formed with the cut-outs 24. The reduction in size of the disc trays 3 to 5 also contributes to reduction in size of the entire apparatus employing the disc trays 3 to 5.

On both sides of the second disc tray 4 are formed ribs 25, 26. These ribs 25, 26 serve for guiding the second disc tray 4 moved horizontally across the inside and the outside of the main body portion of the apparatus. In the reverse side of the second disc tray 4 in register with the ribs 25, 26 are formed grooves 27, which are engaged by lugs 88 constituting a guide rail provided on the sidewall section of the main body portion of the apparatus, in a manner not explained specifically. On the inner surface of one of the ribs 25 is formed a rack gear 28 which is engaged with second and fourth driving gears 81, 83 constituting a driving mechanism for the disc tray 4 in a manner not explained specifically.

On the second and third disc trays 4 and 5 are set upright supporting pins 29, 30 lying on both sides of the opening 23 on one major surface formed with the first and second disc setting sections 21, 22, as shown in FIG. 2. These supporting pins 29, 30 prevent the optical disc from being detached from the second and third disc trays 4 and 5 if the main body portion of the device is tilted when the optical disc is set on the disc tray 3 and housed in this state in the main body portion of the apparatus 2. Meanwhile, the supporting pins 29, 30 are not provided on the first disc tray 3. The first disc tray 3 is also provided with a stop 20 which is located towards the inner side of the rib 26 and which operates for limiting the area of movement of the first disc tray 3.

Figure 4:
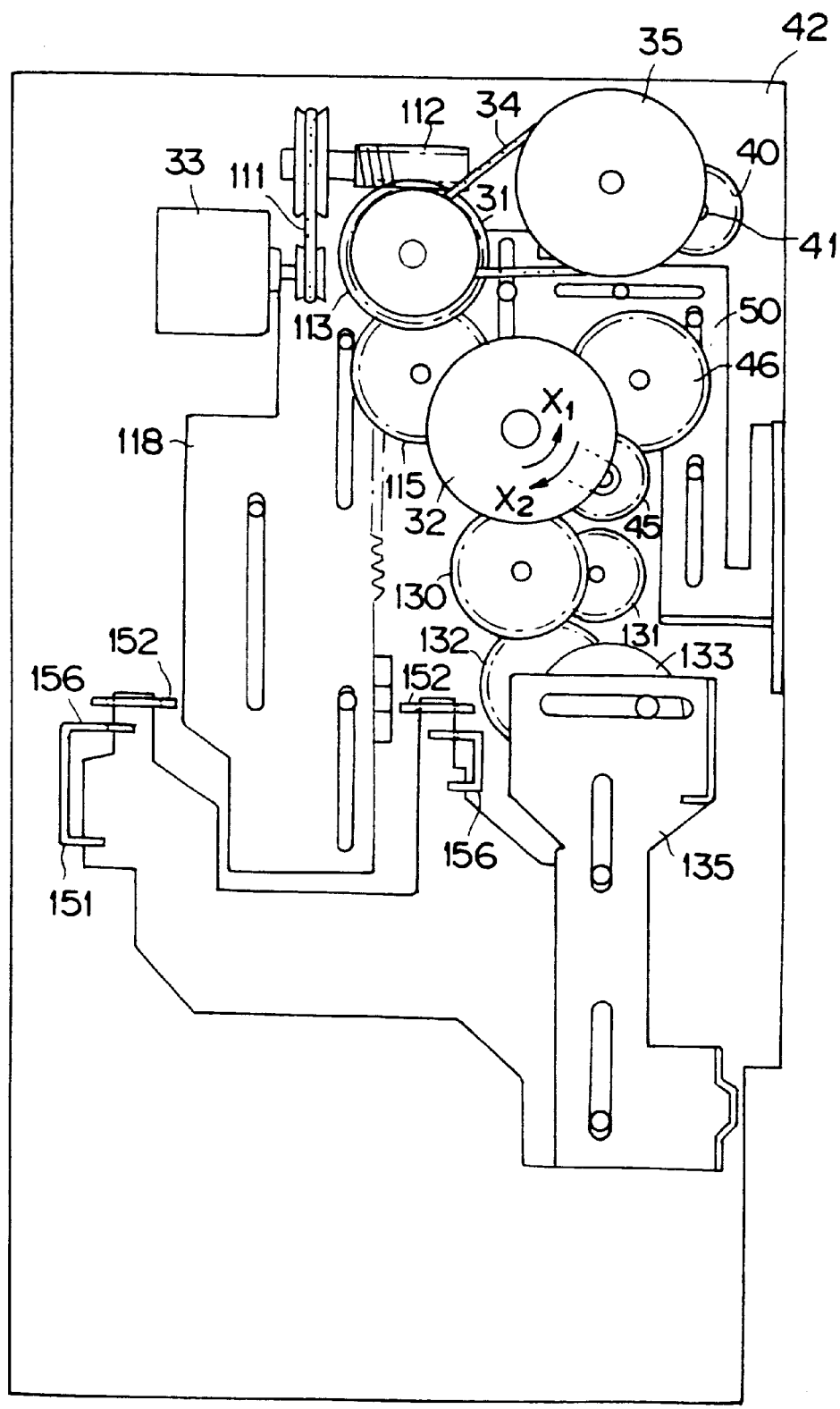
FIG. 4 is a plan view showing a driving portion of the disc tray

Referring to FIG. 4, the driving unit 9, provided on the bottom surface of the main body portion of the apparatus 2, is explained.

This driving unit 9 is provided with a disc tray driving motor 31 for horizontally moving the first to third disc trays 3 to 5, as driving source, a driving motor 32 and a lifting driving motor 33 for driving the disc driving mechanism in an up-and-down direction. The driving motor 32 operates for driving a switching mechanism switching the second deriving power transmitting mechanism for transmitting the driving force to one of the first to third disc trays 3 to 5 in case of necessity, and for clamping the disc driving mechanism. These driving motors 31 to 33 are controlled independently. Since the driving unit 9 is provided on the bottom portion of the main body portion of the apparatus 2 below the first to third disc trays 3 to 5, it becomes possible to reduce the width W, of the main body portion of the apparatus 2.

Figure 5:
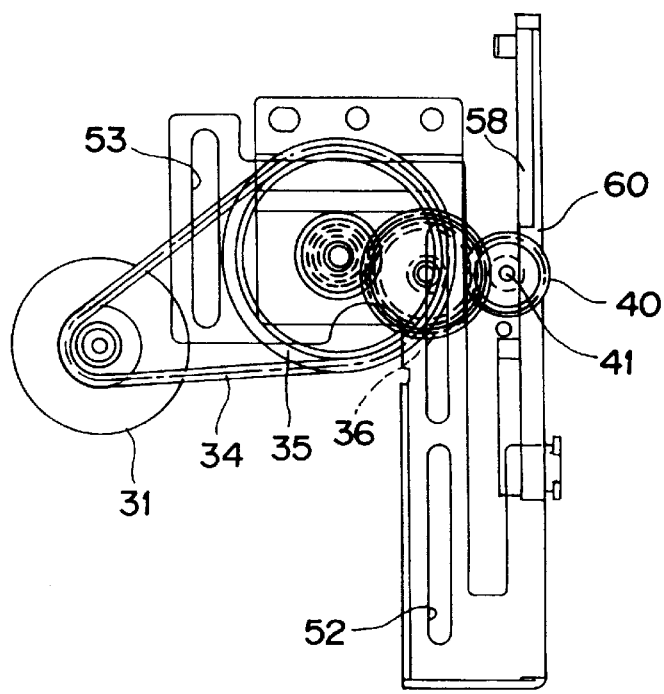
FIG. 5 is a plan view showing a driving mechanism for the disc tray.
Figure 6:
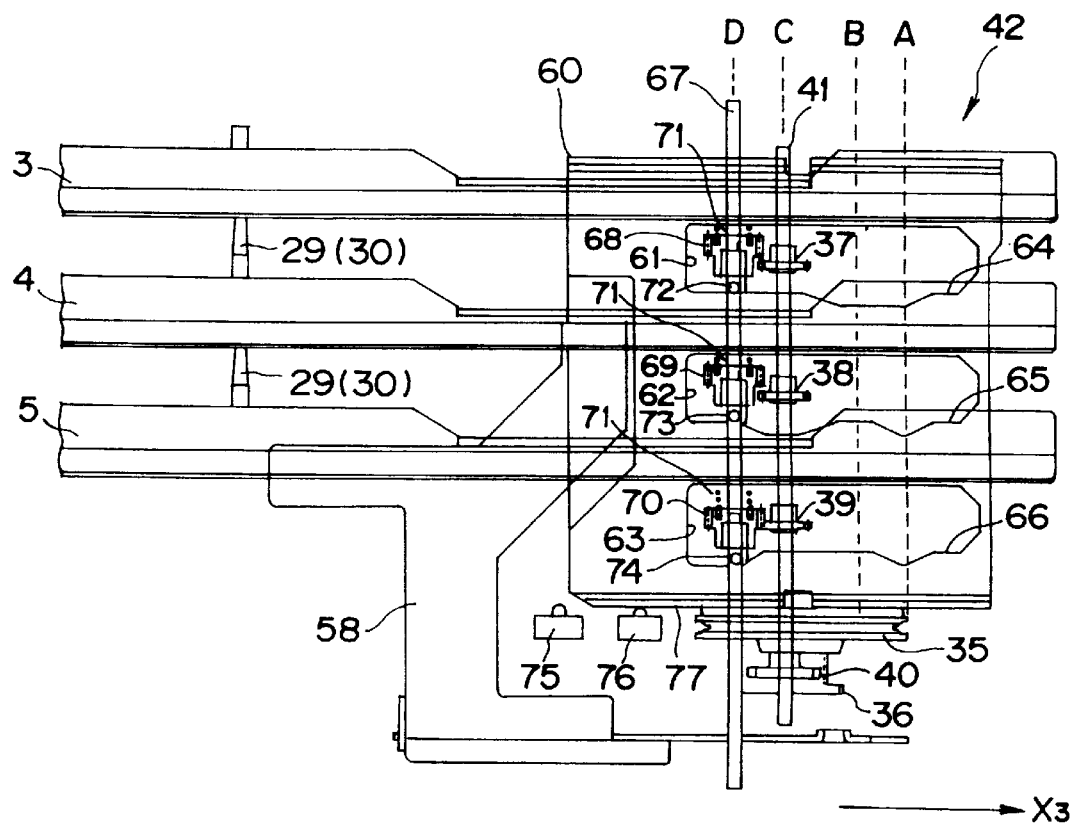
FIG. 6 is a side vide showing a driving mechanism for the disc tray.

Referring to FIGS. 4 to 6, the driving mechanism for the first to third disc trays 3 to 5 will be explained in detail.

The driving mechanism for the first to third disc trays 3 to 5 is driven by a driving motor 31 as a driving source. Specifically, the driving mechanism for the first to third disc trays 3 to 5 is made up of a driving motor 31, a second gear 36 meshing with and rotated by the first gear 35, and a first driving shaft 41, provided with third, fourth and fifth gears 37, 38 and 39 associated respectively with the first to third disc trays 3 to 5 and with a sixth gear 40 meshing with the second gear 36. The first driving shaft 41 is rotatably mounted on a sidewall section 42 arranged along the inner surface of the lateral side of the main body portion of the apparatus 2.

Turning to the above-described driving mechanism for the first to third disc trays 3 to 5, the driving motor 3 1 is rotated perpetually for perpetually rotating the first driving shaft 41 via the first and second gears 35, 36. The first driving shaft 41, rotated perpetually, causes the disc tray, selected by the switching mechanism as now explained, to be moved horizontally across the inside and the outside of the main body portion of the apparatus 2. Since the first driving shaft 41, driven by the driving force from the driving motor 3 1, arranged on the bottom surface of the main body portion of the apparatus 2, is rotatably supported on the sidewall section 42 provided inwardly of the lateral surface of the main body portion of the apparatus 2, the main body portion of the apparatus 2 can be further reduced in width. Although the first driving shaft 41 has been explained for a case of driving the first to third disc trays 3 to 5, this first driving shaft 41 can be used if there is only one disc tray.

Figure 7:
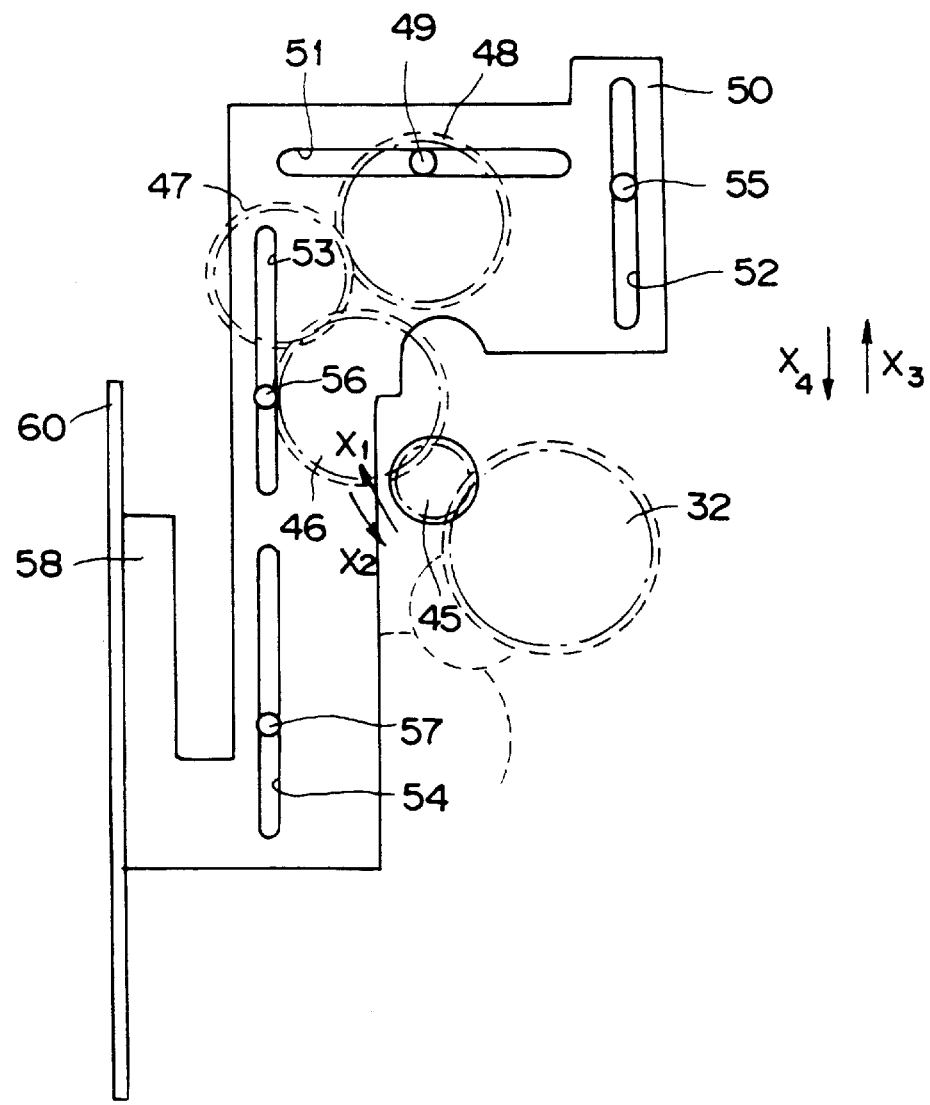
FIG. 7 is a plan view showing a disc tray selection mechanism.

Referring to FIGS. 6 and 7, the disc tray selection mechanism, as a selection mechanism adapted for selecting one disc tray and for transmitting the driving force from the third, fourth and fifth gears 37, 38 and 39 to the second driving power transmitting mechanism adapted for moving the disc tray, is explained in detail.

Referring to FIG. 7, the disc tray selection mechanism has the driving motor 32 as a driving source and is made up of a first gear 45, provided on the driving motor 32, a second gear 46 meshing with the first gear 45, a third gear 47 meshing with the second gear 46 and a fourth gear 48 meshing with the third gear 47. On this fourth gear 48 is set a driving pin 49 engaged in a first engagement groove 51 formed along the width of a driving power transmitting member 50. The first gear 45 provided on the driving motor 32 is mounted for rotation in the directions $X_1$ and $X_2$ in FIG. 7. For driving the driving power transmitting member 50, the first gear 45 is rotated in the direction indicated by arrow $X_1$ in FIG. 7.

By the driving pin 49 engaging in the first engagement groove 51, the rotation of the fourth gear 48 in the transverse direction in FIG. 7 is converted into the movement in the longitudinal direction for moving the driving power transmitting member 50 in the longitudinal direction, that is in the direction indicated by arrow $X_3$ or $X_4$ in FIG. 7. The driving power transmitting member 50 has second to fourth engagement grooves 52 to 54 extending in the longitudinal direction in FIG. 7. These engagement grooves are engaged by supporting pins 55 to 57 set upright on the bottom surface of the main body portion of the apparatus 2 for guiding the movement of the driving power transmitting member 50 in the longitudinal direction in FIG. 7. This driving power transmitting member 50 has an arm 58 extending subsequently at right angles with the major surface formed with first to fourth engagement grooves 51 to 54. This arm 58 is subsequently parallel to the sidewall section 42.

The arm 58 is fitted on its lateral side with a slider 60 slidable in the same direction as the movement direction of the driving power transmitting member 50. This slider 60 is formed with first to third openings 61 to 63, in association with the first to third disc trays 3 to 5, respectively, as shown in FIG. 6. The lower lateral edges of the first to third openings 61 to 63 are formed with first, second and third cam surfaces 64 to 66 adapted for moving first to third counter gears 68 to 70 mounted on a second driving shaft 67 in a manner explained subsequently in detail. At a position A in FIG. 6, all of the cam surfaces 64 to 66 are at lower positions so that the first to third counter gears 68 to 70 mounted on a second driving shaft as later explained can be moved in the up-and-down direction in two steps. At a position B in FIG. 6, only the first cam surface 64 is at a lower position, while the second and third cam surfaces 65, 66 are at a position higher than the first cam surface 64. At a position C in FIG. 6, only the second cam surface 65 is at a lower position, while the first and third cam surfaces 64, 66 are above the second cam surface 65. At a position D in FIG. 6, only the third cam surface 66 is at a lower position, with the first and second cam surfaces 64, 65 being above the third cam surface 66.

Referring to FIG. 6, the second driving shaft 67 is rotatably mounted on the sidewall section 42 parallel to the first driving shaft 41, and the first to third counter gears 68 to 70 are mounted in association with the third, fourth and fifth gears 37, 38 and 39 mounted on the first driving shaft 41. These first to third counter gears 68 to 70 are mounted on the first to third openings 61 to 63. On the upper sides of the first to third counter gears 68 to 70 are mounted coil springs 71 biasing the first to third counter gears 68 to 70 towards the lower sides of the first to third openings 61 to 63 on the lower portion of FIG. 6. Below the first to third counter gears 68 to 70 are mounted supporting pins 72 to 74. These supporting pins 72 to 74 are caused to bear against first to third cam surfaces 64 to 66 of the slider 60.

The first to third counter gears 68 to 70 are rotated by selection of one or all of the third, fourth and fifth gears 37, 38 and 39 mounted on the first driving shaft 41 which are brought into meshing by movement of the slider 60 in the directions indicated by arrows $X_3$ or $X_4$ in FIG. 6. That is, if the second driving shaft 67 is at the position A of the slider 60, the first, second and third cam surfaces 64 to 66 are at the lower positions, Ws described above. Thus, the supporting pins 72 to 74, mounted on the second driving shaft 67, are positioned below the first, second and third cam surfaces 64 to 66 under the bias of the coil spring 71. Thus, the first to third counter gears 68 to 70 are engaged with the third, fourth and fifth gears 37, 38 and 39 mounted on the first driving shaft 41 for transmitting the driving force of the driving motor 31 for effecting the rotation.

If the second driving shaft 67 is at the position B of the slider 60 shown in FIG. 6, only the first cam surface 64 is at the lower position, so that the second and third cam surfaces 65, 66 are above the first cam surface 64. Only the supporting pin 72 mounted on the second driving shaft 67 is at the lower position, while the second and third pins 73, 74 are raised to positions above the second and third cam surfaces 65, 66. Therefore, only the first counter gear 68 meshes with the third gear 37 mounted on the first driving shaft 41 so that the driving force of the driving motor 31 is transmitted to the third gear 37 to effect its rotation by way of selecting the first to third counter gears 68 to 70.

If the second driving shaft 67 is at the position C of the slider 60 shown in FIG. 6, only the second cam surface 65 is at the lower position, while the first and third cam surfaces 64, 66 are above the second cam surface 65, so that only the supporting pin 73 mounted on the second driving shaft 67 is at a lower position, while the first and third supporting pins 72, 74 are lifted to upper positions by the first and third cam surfaces 64, 66. Therefore, only the second counter gear 69 meshes with the fourth gear 38 mounted on the first driving shaft 41 so that the driving force of the driving motor 3 1 is transmitted to the fourth gear 38 to effect its rotation by way of selecting the first to third counter gears 68 to 70.

If the second driving shaft 67 is at the position D of the slider 60 shown in FIG. 6, only the third cam surface 66 is at the lower position, while the first and second cam surfaces 64, 65 are above the second cam surface 66, so that only the supporting pin 74 mounted on the second driving shaft 67 is at a lower position, while the first and second supporting pins 72, 73 are lifted to upper positions by the first and second cam surfaces 64, 65. Therefore, only the third counter gear 70 meshes with the fifth gear 39 mounted on the first driving shaft 41 so that the driving force of the driving motor 31 is transmitted to the fifth gear 39 to effect its rotation by way of selecting the first to third counter gears 68 to 70.

Figure 8:
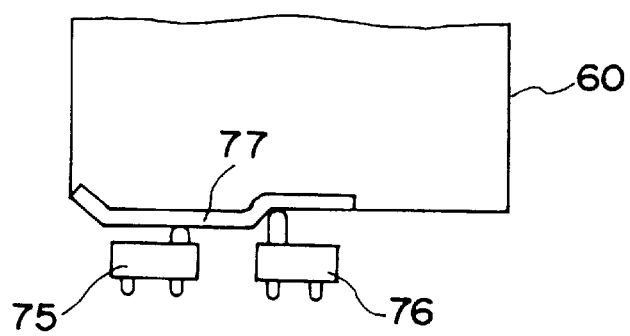
FIG. 8 is a side view showing a position detection mechanism adapted for detecting the position of a slider of the disc tray driving mechanism shown in FIG. 5.

The detection as to in which of the positions A to D of FIG. 6 the slider 60 is positioned is effected by a first detection switch 75 and a second detection switch 76 mounted on the sidewall section 42 below the slider 60, and a protrusion 77 mounted on one lateral side of the lower edge of the slider 60, as shown in FIG. 8. Specifically, the above detection is effected depending on which of the detection switches 75, 76 is thrust by the protrusion 77 as a result of movement of the slider 60.

Figure 9:
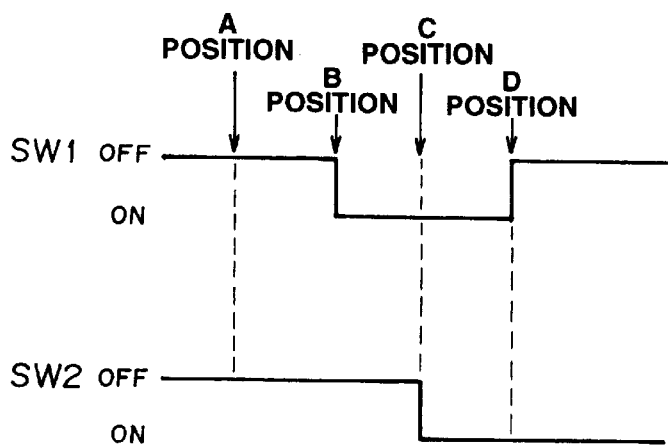
FIG. 9 illustrates the operation of the disc tray driving mechanism.

Specifically, if the slider 60 is at the position A in FIGS. 6 and 9, neither the first detection switch 75 nor the second detection switch 76 is thrust by the protrusion 77 and hence are in the off state. If the slider 60 is at the position B in FIGS. 6 and 9, the first detection switch 75 is thrust by the protrusion 77 and hence is in the on-state, while the the second detection switch 76 is not thrust by the protrusion 77. If the slider 60 is at the position C in FIGS. 6 and 9, both the first detection switch 75 and the second detection switch 76 are thrust by the protrusion 77 and hence are in the on state. If the slider 60 is at the position D in FIGS. 6 and 9, the first detection switch 75 is not thrust by the protrusion 77 and hence is in the off-state, while the the second detection switch 76 is thrust by the protrusion 77 and hence is in the on-state. Thus, the position detection by the slider 60 is by the first detection switch 75 and a second detection switch 76 with the use of four bits. That is, the position detection by the slider 60 is effected accurately to realize accurate switching of the first to third disc trays 3 to 5. There is no particular limitation to the number of the first and second detection switches 75, 76 if the position of the slider 60 can be detected accurately.

Although the slider 60 is used in the above embodiment as selection means for selecting the three disc trays 3 to 5, it can also be used for a case of using only one disc tray. In this case, the slider 60 is used for switching between transmission and non-transmission depending on whether the disc tray is moved across the inside and the outside of the main body portion of the apparatus for disc exchange or whether the disc tray cannot be moved during reproduction. The shape of the first to third openings 61 to 63 and the first, second and third cam surfaces 64 to 66 of the slider 60 is not limited to that described above since it depends on the number of the disc trays. For example, if the disc trays are provided in four stages, the number of the openings is 4, such that the cam surfaces are provided correspondingly.

If one or all of the first to third discs 3 to 5 is selected by the slider 60, the discs 3 to 5 are horizontally moved across the inside and the outside of the main body portion of the apparatus 2 by the disc tray transmitting mechanism, which is the second driving power transmitting mechanism, as now explained. Since the driving mechanism of each of the first to third disc trays 3 to 5 is similar in construction, the driving mechanism for the first disc tray 3, taken as an example, is explained in detail.

Figure 10:
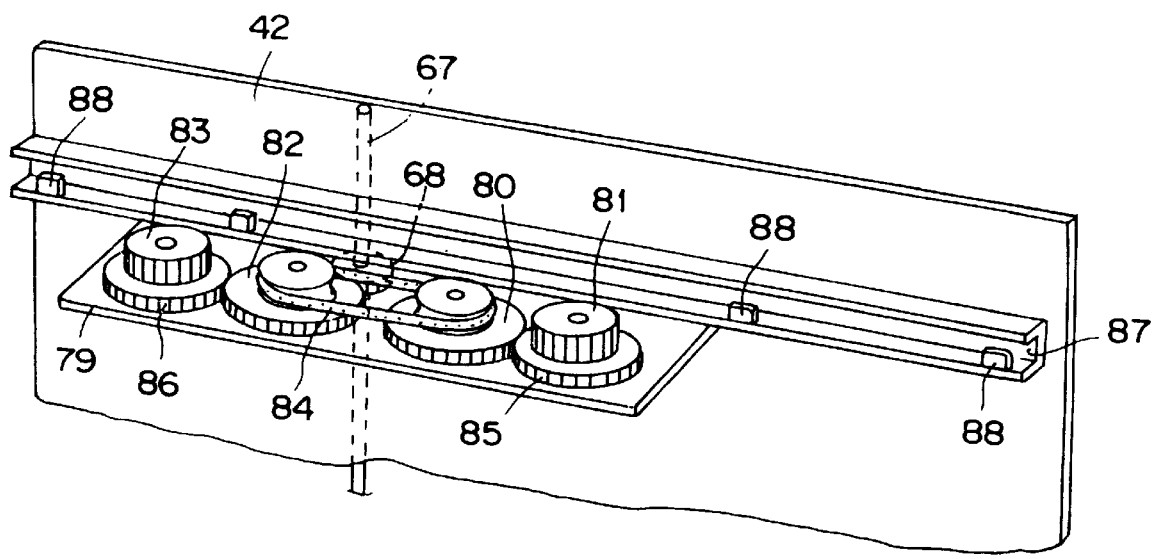
FIG. 10 is a perspective view showing essential portions of the disc tray driving mechanism.

Referring to FIG. 10, the driving mechanism for the disc tray 3 includes, on a supporting block 79, provided on the sidewall section 42, a first driving gear 80, meshing with the first counter gear 68, a second driving gear 81 meshing with the first driving gear 80, a third driving gear 82, mounted facing the second driving gear 81, and a fourth driving gear 83 meshing with the third driving gear 82. The first to fourth driving gears 80 to 83 are mounted in a row along the sidewall section 42. The first driving gear 80 is connected to the third driving gear 82 via an endless belt 84 without being directly connected thereto.

The second driving gear 81 and the fourth driving gear 83, disposed on both extreme ends of the first to fourth driving gears 80 to 83, are arranged coaxially with first and second gears 85, 86, overlying the gears 81, 83 and meshing with the rack gear 28 of the first disc tray 3. That is, by arranging the second driving gear 81 and the fourth driving gear 83, fitted with the first and second gears 85, 86 directly meshing with the first disc tray 3, on both ends of the set of driving gears 80 to 83, arranging the first driving gear 80 and the third driving gear 82 at a spacing from each other and by interconnecting the gears 80 and 82 by the endless belt 84, a large movement area is secured for the first disc tray 3. This permits movement of the first disc tray 3 from an optical disc inserting/detaching position outside the main body portion of the apparatus 2 as far as the disc reproducing unit 10.

Referring to FIG. 10, the sidewall section 42 has a guide groove 87 over the driving gears 80 to 83 for guiding the first disc tray 3 by engaging with the rib 25 of the first disc tray 3. This guide groove 87 has the plural lugs 88 engaged with recessed grooves 27 of the first disc tray 3. Three of the recessed grooves 27 are provided in association with the second and third disc trays 4 and 5.

If the first counter gear 68 is selected by the slider 60, the driving power is transmitted to the first driving gear 80 to cause rotation of the second driving gear 81 and to cause rotation of the third driving gear 82 via endless belt 84 and that of the fourth driving gear 83 meshing therewith. This causes rotation of the gears 85, 86 mounted in the second driving gear 81 and the fourth driving gear 83 to cause horizontal movement of the third disc tray 3 via rack gear 28 of the third disc tray 3 meshing therewith.

Figure 11:
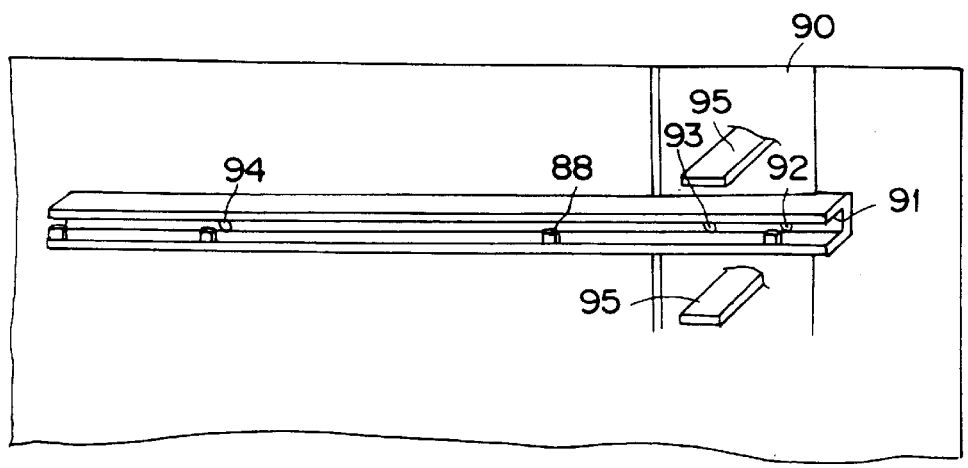
FIG. 11 is a perspective view showing the position of the disc tray provided on the disc tray.
Figure 12:
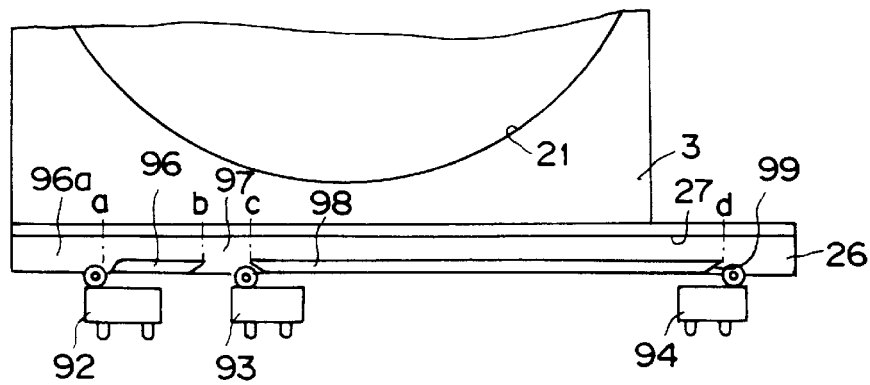
FIG. 12 is a plan view showing the relation between the disc tray and a detection switch.

Referring to FIGS. 11 and 12, the opposite sidewall section 90 has a recessed tray guide groove 91 engaged by the opposite side rib 26 of the first disc tray 3 for guiding the first disc tray 3. This tray guide groove 91 has a first detection switch 92 and a second detection switch 93 on the front side of the main body portion of the apparatus 2 for detecting the position of the first detection switch 92 and a third detection switch 94 at a mid portion of the main body portion of the apparatus 2. Three of the tray guide grooves 91 are provided on the sidewall section 90 in association with the second and third disc trays 4 and 5. Although the respective tray guides 91 are provided for the first to third detection switches 92 to 94, these are not explained specifically because these tray guide grooves are structured similarly to the tray guide groove 91 provided in association with the first disc tray 3.

Referring to FIG. 12, the first to third detection switches 92 to 94 are thrust by the thrusting portion provided on the rib 26 of the first disc tray 3. This thrusting portion is made up of a first cut-out 96a, ahead of a point a in FIG. 12, a first thrusting portion 96 provided between points a and b, a second cut-out 97 provided between points b and c, a second thrusting portion 98 provided between points c and d, and a third cut-out 99 provided downstream of the point d. The position of the first disc tray 3 is set depending on whether the first to third detection switches 92 to 94 are thrust by the first and second thrusting portions 96 and 98.

Figure 13:
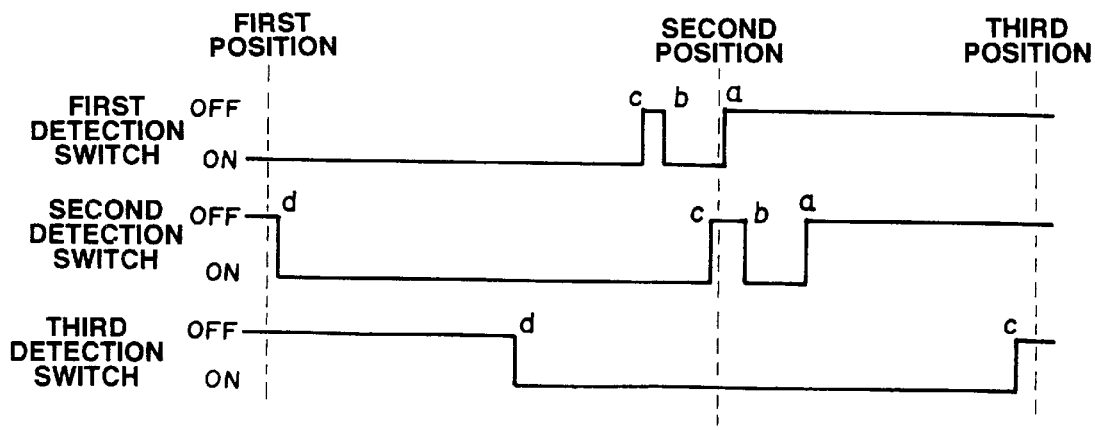
FIG. 13 illustrates the operation of a position detection mechanism adapted for detecting the disc tray position.

Specifically, the position of the first disc tray 3 is detected as shown in FIGS. 12 and 13. First, if the first disc tray 3 is outside the main body portion of the apparatus 2 to permit disc exchange, the first detection switch 92 is turned on by being thrust by the first thrusting portion 96, while the second and third detection switches 92, 93 are turned off by being not thrust by the third cut-out 99. Next, when the first disc tray 3 is moved into the inside of the main body portion of the apparatus 2 to a stand-by position of keeping the optical disc at the playback position, the first detection switch 92 is turned on by being thrust by the first thrusting portion 96, while the second detection switch 93 is in register with the second cut-out 97 and hence is not thrust and thus tuned off and the third detection switch 94 is thrust by the second thrusting portion 98 and thus turned on. When the first disc tray 3 is at the reproducing position in the disc reproducing unit 10, all the detection switches 92 to 94 are not thrust and hence are turned off.

Thus, position detection for the first disc tray 3 is by the detection states of the first to third detection switches 92 to 94 as shown in Table 1. The disc exchange enabling position outside the main body portion of the apparatus 2 is detected by the first detection switch 92 being turned on and the second and third detection switches 93, 94 being turned off, as shown in Table 1. The stand-by position is detected by the first and third detection switches 92, 94 being turned on and the second detection switch 93 being turned off, as shown in Table 1. The reproducing position is detected by the first to third detection switches 92 to 94 all being turned off.

TABLE 1

|  | first detection switch | second detection switch | third detection switch |
| --- | --- | --- | --- |
| exchange position | ON | OFF | OFF |
| stand-by position | ON | OFF | ON |
| reproducing position | OFF | OFF | OFF |

As for the position detection of the first disc tray 3, the first detection switch 92 is once turned off by the second cut-out 97 when the first disc tray 3 is moved from the disc exchange enabling position to the reproducing position, as shown in FIG. 13. Thus, when the first disc tray 3 is moved from the disc exchange enabling position to the stand-by position, the stand-by position is detected after detection of the off-state of the first detection switch 92. On the other hand, if the first disc tray 3 is moved from the stand-by position to the disc exchange enabling position, the off-state of the first disc tray 3 is detected after detection of the stand-by position. That is, the first detection switch 92 detects the movement direction of the first disc tray 3.

With the position detection mechanism, made up of the first to third disc trays 3 to 5, it becomes possible to reduce the size of the apparatus, because the first to third detection switches 92 to 94 are provided in the tray guide groove 91 adapted for guiding these disc trays. Moreover, the stop position of the first disc tray 3 can be detected accurately because three detection switches are provided in the tray guide groove 91. Meanwhile, there is no limitation to the number of the first to third detection switches 92 to 94 such that any other number of the disc trays can be used if the disc tray position can be detected accurately.

The portion of the tray guide groove 91 towards the front side of the main body portion of the apparatus 2 is provided with a retention piece 95 associated with the stop 20 provided on the first to third disc trays 3 to 5. This retention piece 95 operates as a stop when the first to third disc trays 3 to 5 are moved to the disc exchange enabling position outside the main body portion of the apparatus 2.

Figure 14:
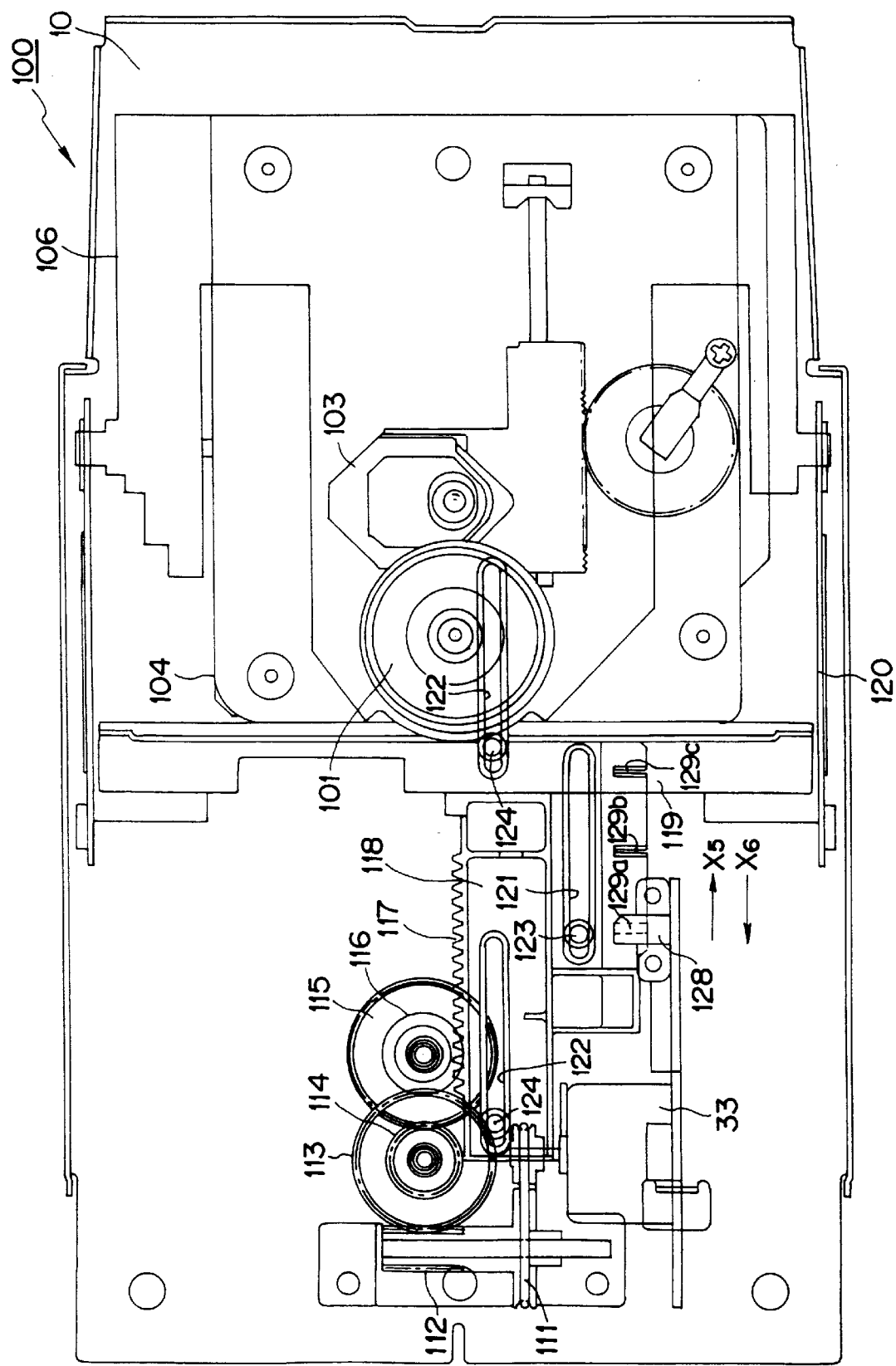
FIG. 14 is a plan view showing a lift mechanism of a disc reproducing unit.
Figure 15:
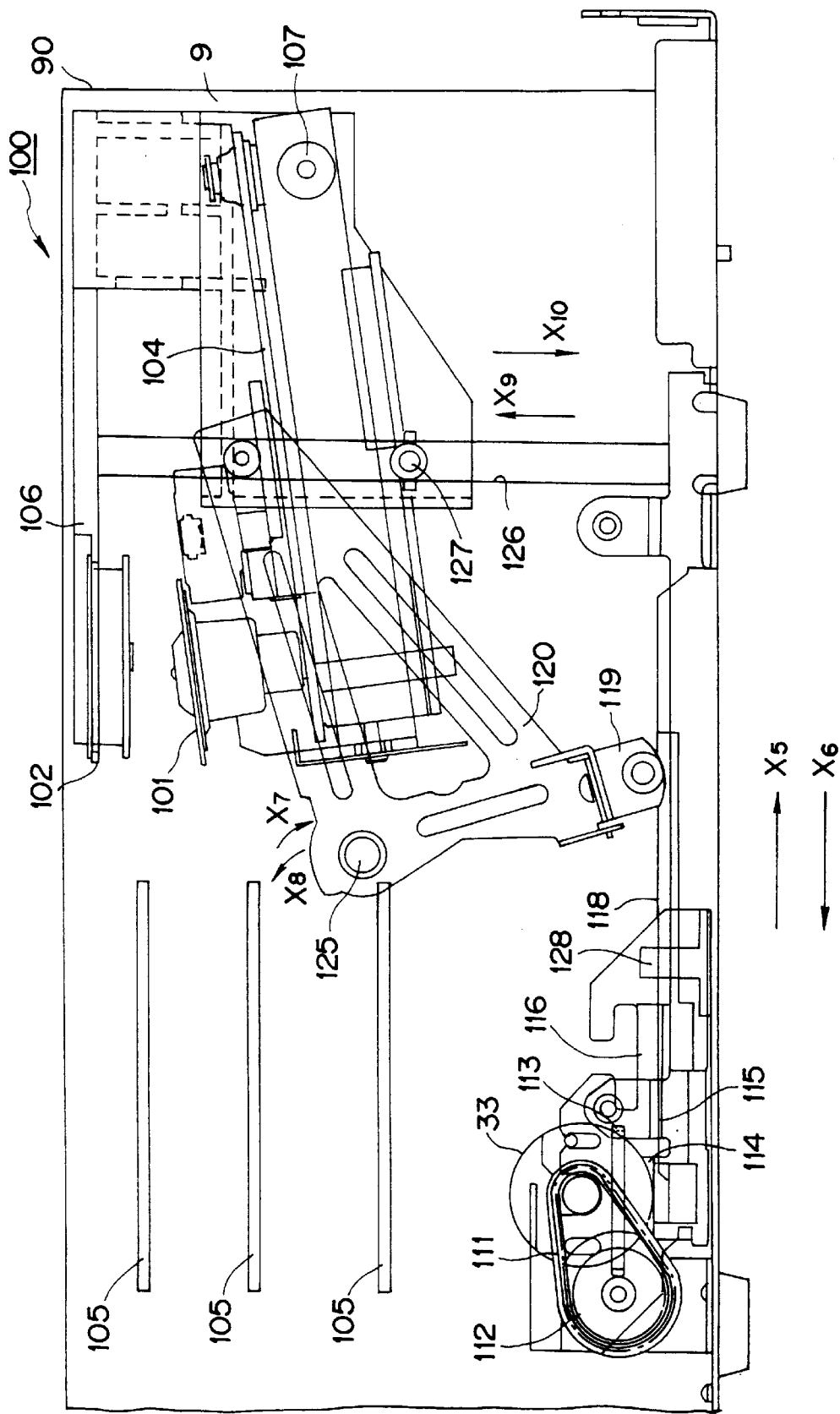
FIG. 15 is a side vide showing a lift mechanism for the disc reproducing unit.

Referring to FIGS. 4, 14 and 15, the disc reproducing unit 10, arranged further inwardly of the first to third disc trays 3 to 5 in the stand-by position within the main body portion of the apparatus 2 is explained in detail.

The disc reproducing unit 10 includes a disc rotating operating mechanism 100 for rotating an optical disc 105 transported by the first to third disc trays 3 to 5, a disc clamper 102 for clamping the optical disc 105 on a disc table 101 of the disc rotating operating mechanism 100 and an optical pickup device 103 for scanning the optical disc 105 rotated by the disc reproducing unit 100 for reading out information signals recorded on the optical disc 105. The disc rotating operating mechanism 100 has a disc table supporting member 104 for supporting the disc table 101 and a damper support base 106 for supporting the disc damper 102. The disc table supporting member 104 is rotatably supported via a hinge 107.

The disc rotating operating mechanism 100 of the disc reproducing unit 10 is moved in the up-and-down direction in the arraying direction of the first to third disc trays 3 to 5 arrayed in the direction of height of the main body portion of the apparatus 2. The disc reproducing unit 10 approaches to the first to third disc trays 3 to 5 moved to the disc reproducing position for clamping the optical disc 105 on the disc table 101. Thus, the optical disc 105 is run in rotation for reproducing the information signals recorded on the optical disc 105.

The lift mechanism for moving the disc rotating operating mechanism 100 along the height of the main body portion of the apparatus 2 includes a driving motor 33, a worm gear 112 run in rotation by the driving motor 33 via a driving belt transmission belt 111 and a counter gear 113 meshing with and rotated by the worm gear 112. The lift mechanism also includes a driving gear 115 meshing with a first gear 114 formed as-one with the counter gear 113, a second gear 116 formed as-one with the driving gear 115, a slider 118 provided with a rack gear 117 meshing with the second gear 116 and moved in the direction indicated by arrow $X_5$ or $X_6$ in FIGS. 14 and 15, and a supporting member 119 mounted on the slider 118. The lift mechanism further includes a rotary arm 120 rotatably supported by this supporting member 119 for rotation in the directions indicated by arrows $X_7$ and $X_8$ in FIG. 15, supported by the sidewall section 90 and adapted for being moved by the disc rotating operating mechanism 100 along the height of the main body portion of the apparatus 2, that is in the directions indicated by arrows $X_9$ and $X_{10}$ in FIG. 15.

The slider 118 is formed with slide guide grooves 121, 122 for extending along the directions indicated by arrows $X_5$ and $X_6$ in FIG. 14. In these slide guide grooves 121, 122 are engaged supporting pins 123, 124 for guiding the slider 118. The rotary arm 120 has its corner rotatably supported via a supporting portion 125 by the opposite sidewall section 90 facing the sidewall section 42, while having its end not supported on the supporting member 119 supported by a supporting pin 127 via a guide groove 126 formed in the sidewall section 90.

Figure 16:
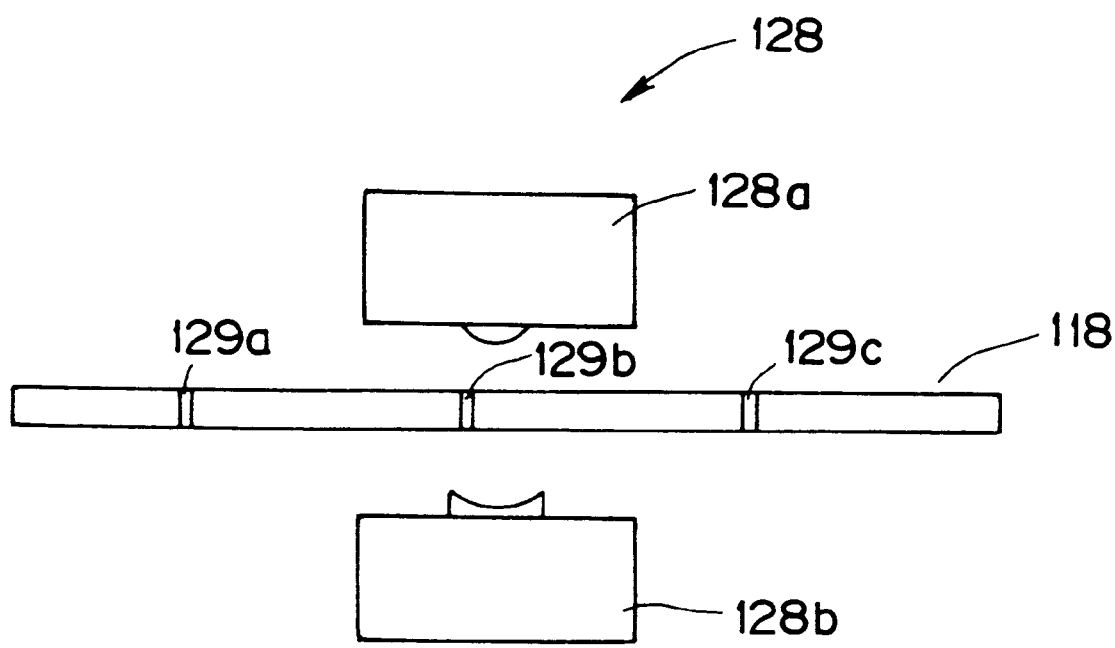
FIG. 16 is a side view for detecting the height of the disc reproducing unit.

The slider 118 is provided with a position detection sensor 128 for halting the disc rotating operating mechanism 100 at the height corresponding to one of the first to third disc trays 3 to 5, as shown in FIG. 16. The position detection sensor 128 is a photodetector made up of a light emitting portion 128a and a light receiving portion 128b. The slider 118 is arranged between the light emission portion 128a and the light receiving portion 128b. The slider 118 is formed with three through-holes 129a, 129b, 129c in meeting with the heights of the first to third disc trays 3 to 5 for transmitting the laser light emitted by the light emitting portion 128a. The through-hole 129a is provided in register with the height position of the disc rotating operating mechanism 100 in meeting with the first disc tray 3 at the uppermost position. The through-hole 129b is provided in register with the height position of the disc rotating operating mechanism 100 in meeting with the second disc tray 4 at the mid position, while the through-hole 129c is provided in register with the height position of the disc rotating operating mechanism 100 in meeting with the third disc tray 53 at the lowermost position. The position detection sensor 128 detects the optimum position of the disc rotating operating mechanism 100 in meeting with the height of one of the first to third disc trays 3 to 5.

In the above-described lift mechanism of the disc rotating operating mechanism 100, if the driving motor 33 is rotated in one direction, as indicated in FIGS. 14 and 15, the slider 118 is moved in the direction of arrow $X_6$ in FIGS. 14 and 15 via the driving belt transmission belt 111 and the gears 112 to 116. At this time, the rotary arm 120 is rotated in the direction indicated by arrow $X_7$ in FIG. 15, about the supporting portion 125 as the center of rotation, at the same time as the supporting pin 127 is moved downwards, that is in the direction of arrow $X_{10}$ in FIG. 15, for lowering the disc rotating operating mechanism 100. If the lift mechanism is run in rotation in the opposite direction, the slider 118 is moved in the direction of arrow $X_5$ in FIGS. 14 and 15, via the driving belt transmission belt 111 and the gears 112 to 116. At this time, the rotary arm 120 is rotated in the direction indicated by arrow $X_8$ in FIG. 15, about the supporting portion 125 as the center of rotation, at the same time as the supporting pin 127 is moved in the direction of arrow $X_9$ in FIG. 15 for lifting the disc rotating operating mechanism 100. That is, the disc rotating operating mechanism 100 is moved by this lift mechanism to the positions in meeting with the first to third disc trays 3 to 5 for clamping the optical disc 105.

The disc rotating/driving unit 100 is moved only if detection switches 92, 93, 94 for detecting the disc exchange enabling position, standby position and the playback position of the first, second and third disc trays 3, 4 and 5 shown in FIG. 12 detect that the disc trays 3 to 5 are all in the standby position. This prevents the disc rotating operating mechanism 100 from being lifted or lowered when one of the first to third disc trays 3 to 5 is at the reproducing position to positively prevent destruction of the optical disc or the disc rotating operating mechanism 100.

Figure 17:
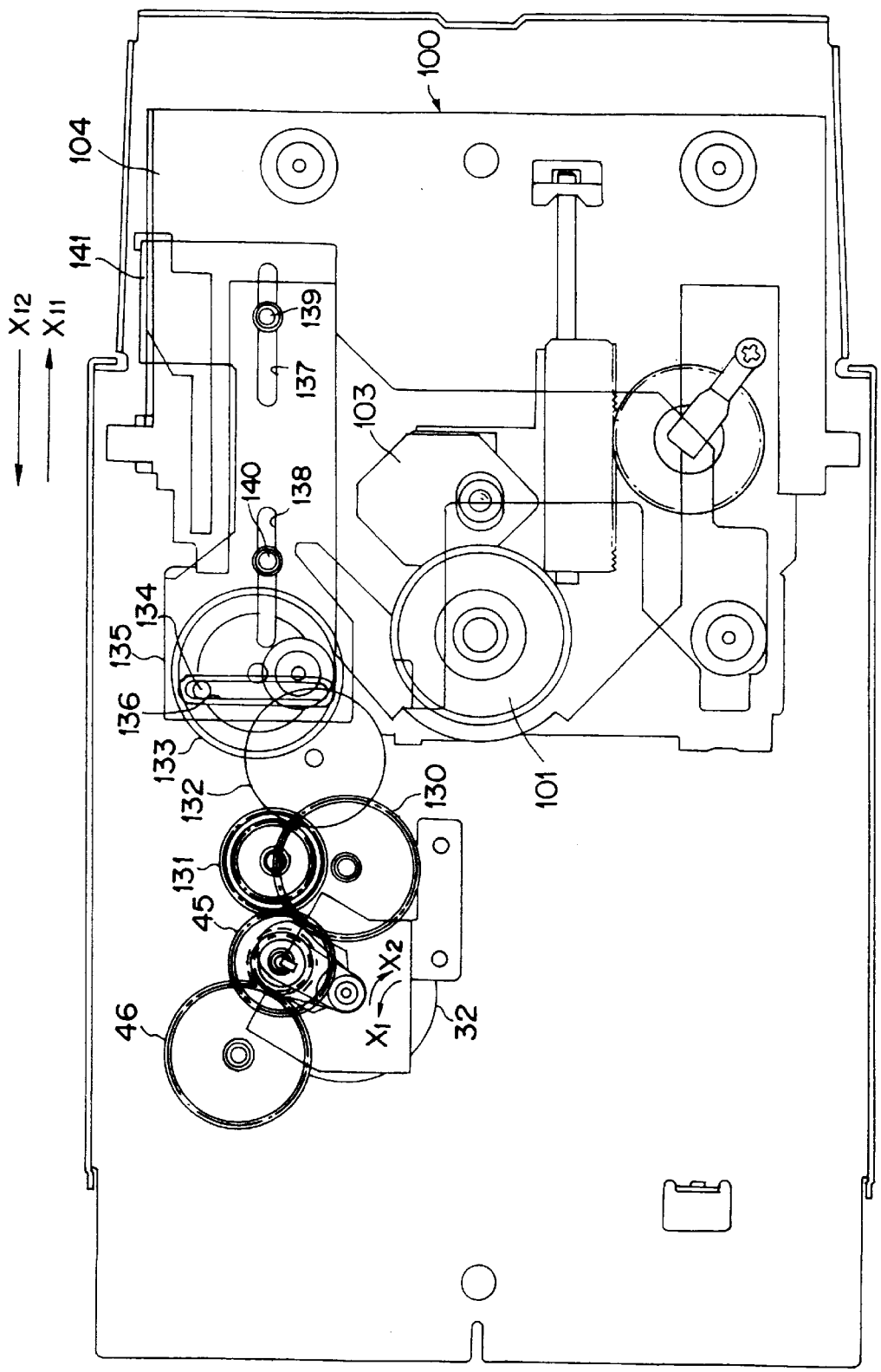
FIG. 17 is a plan view of a disc player showing its clamp mechanism.
Figure 18:
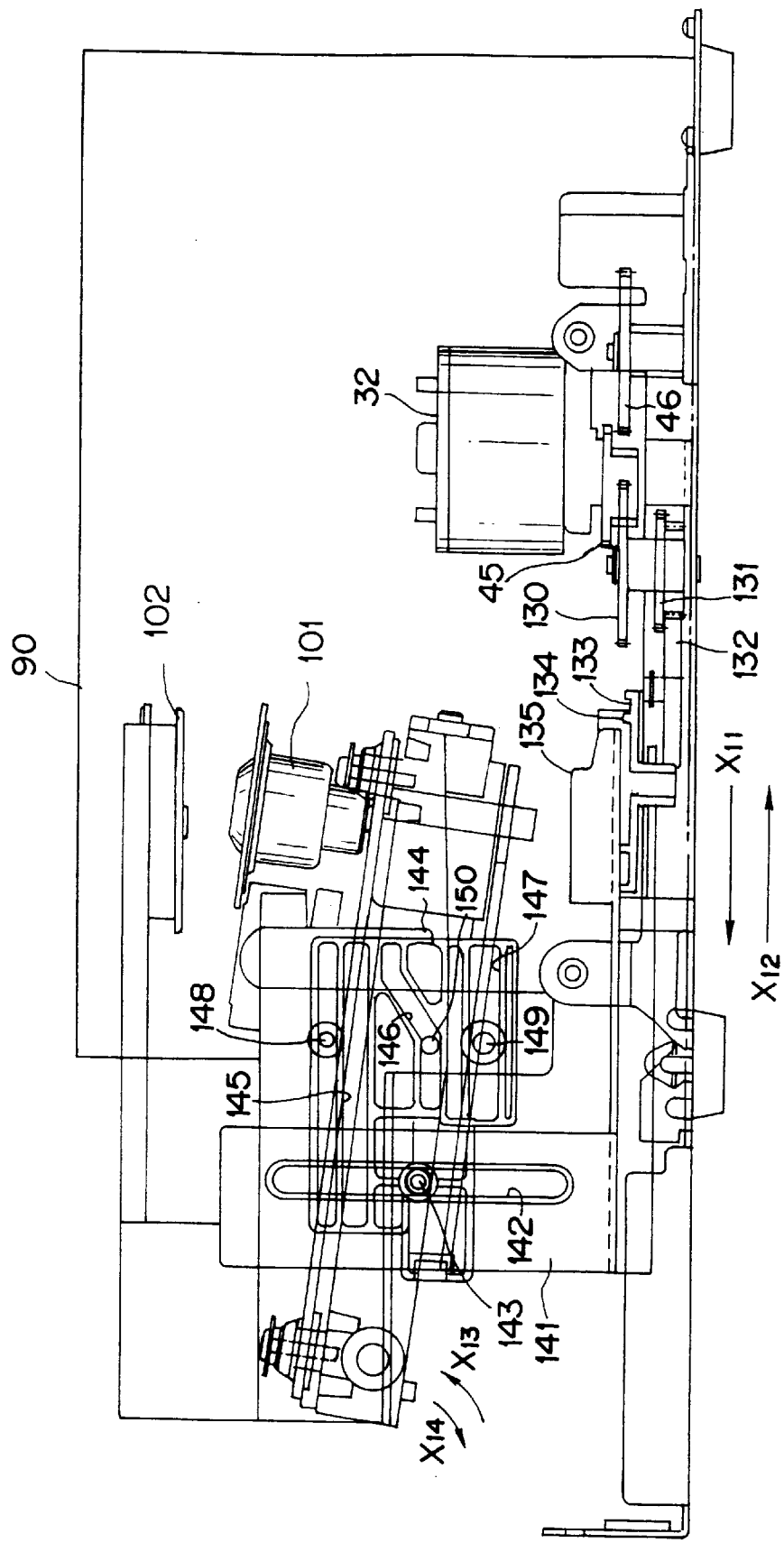
FIG. 18 is a side view of a disc player showing the clamp mechanism.

The disc table supporting member 104 supporting the disc table 101 and the damper support base 106 supporting the disc damper 102 clamp the optical disc 105 on rotation of the disc table supporting member 104, as shown in FIGS. 17 and 18. This clamp mechanism includes a driving motor 32 for moving the slider 60 constituting a switching mechanism for the first to third disc trays 3 to 5. The clamp mechanism also includes a first gear 45 provided on the driving motor 32, a second gear 130 run in rotation by the first gear 45, a third gear 131 run in rotation by the second gear 130, a fourth gear 132 run in rotation by the third gear 131 and a fifth gear 133 run in rotation by the fourth gear 132.

The first gear 45 of the driving motor 32 is rotated in the direction indicated by arrow $X_2$ in FIGS. 4 and 17 into meshing with the second gear 130. For moving the slider 60 constituting the switching mechanism for the disc trays, the first gear 45 is rotated in the direction indicated by arrow $X_1$ in FIG. 17 into meshing with the second gear 46 for transmitting the driving power of the driving motor 32 to the second gear 42. After the end of the selection of the first to third disc trays 3 to 5, this driving motor 32 is not used, such as to evade overlapping with the clamping of the optical disc 105. Therefore, by rotating the first gear 45 in the direction indicated by arrow $X_2$ in FIG. 17 into meshing with the second gear 130, the driving motor 32 operates as a driving source for the slider 60 and as a driving source for the clamp mechanism. That is, the driving motor 32 is used as a driving source for the two units for saving the power of the driving unit 9.

The fifth gear 133 is provided with a driving pin 134 engaged in a first guide groove 136 formed in the horizontal direction in a movement member 135. This slide member 135 is moved in the directions of arrows $X_{11}$ or $X_{12}$ in FIGS. 17 and 18. This movement member 135 is formed not only with the first guide groove 136 but also with second and third guide grooves 137, 138 extending in the same direction as the movement direction of the movement member 135. These second and third guide grooves 137, 138 are engaged by supporting pins 139, 140 for guiding the movement direction. A guide piece 141 is set upright for extending along the sidewall section 42. The slide member 135 has the supporting pin 134 engaged with the first guide groove 136 for converting the transverse movement of the fifth gear 133 into the movement in the longitudinal direction, that is into movement along the direction of arrows $X_{11}$ or $X_{12}$ in FIGS. 17 and 18.

The guide piece 141 has a fourth guide groove 142 for extending along the height. This fourth guide grove 142 is engaged by a lug 143 provided on a motive power transmitting member 144 mounted on the disc rotating operating mechanism 100 as later explained in detail. This fourth guide grove 142 guides the movement of the disc rotating operating mechanism 100 in the direction along the height of the disc rotating operating mechanism 100 in cooperation with the guide groove 126 formed in the sidewall section 90. The fourth guide grove 142 also transmits the operation of the slide member 135 in the direction of arrows $X_{11}$ or $X_{12}$ in FIGS. 17 and 18 to the disc rotating operating mechanism 100.

Figure 19:
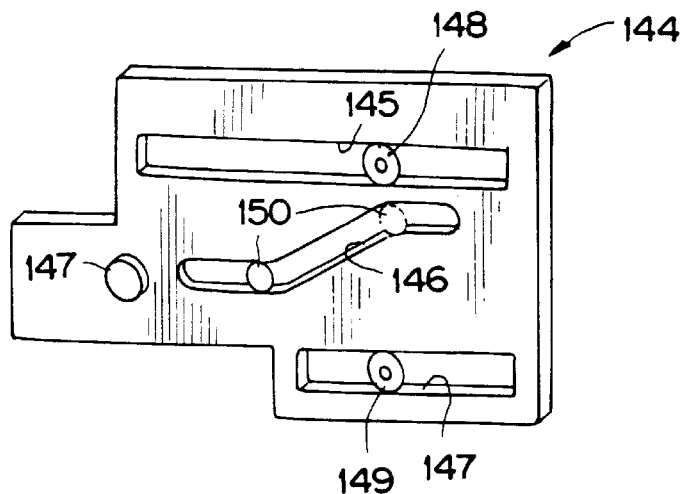
FIG. 19 is a perspective view showing a drive transmitting member adapted for rotating a disc table supporting member.

Referring to FIG. 19, the disc table supporting member 104 of the disc rotating operating mechanism 100 carries a driving power transmitting member 144 for movement in the same direction as the movement direction of the slide member 135. The driving power transmitting member 144 has fifth, sixth and seventh guide grooves 145, 146, 147. The fifth and seventh guide grooves 145, 147 are provided in the same direction as the movement direction of the driving power transmitting member 144. The disc table supporting member 104 is mounted in position by supporting pins 148, 149 being inserted through the fifth and seventh guide grooves 145, 147. Thus, the fifth and seventh guide grooves 145, 147 guide the movement direction of the driving power transmitting member 144. The sixth guide groove 146 is provided for extending between the fifth and seventh guide grooves 145, 147 with a rightward slope in FIG. 19. This sixth guide groove 146 is passed through by a supporting pin 150 for mounting on the disc table supporting member 104. Thus, if the driving power transmitting member 144 is moved, the disc table supporting member 104 is rotated in the directions indicated by arrows $X_{13}$ or $X_{14}$ in FIG. 18 because the supporting pin 150 is inserted through the inclined sixth guide groove 146.

In the above-described damper mechanism for the optical disc 105, if the first gear 45 is rotated in the direction of arrow $X_2$ in FIG. 17 for rotating the first gear 145, the slider 135 is moved in the directions of arrows $X_{11}$ or $X_{12}$ in FIG. 17, via the second to fifth gears 130 to 133, for moving the driving power transmitting member 144 of the disc rotating operating mechanism 100 mounted on the guide piece 141 in the same direction as the movement direction of the slider 135. This causes the supporting pin 150 to be moved along the inclined sixth guide groove 146 to cause the disc table supporting member 104 to be rotated in the directions indicated by arrows $X_{13}$ or $X_{14}$ in FIG. 18.

Specifically, when the slider 135 is moved in the directions indicated by arrow $X_{11}$ in FIGS. 17 and 18, the supporting pin 150 is positioned at an upper row of the sixth engagement groove 146 for causing rotation of the disc table supporting member 104 in the direction of arrow $X_{13}$ in FIG. 18 for clamping the optical disc 105. When the slider 135 is moved in the direction of arrow $X_{12}$ of FIGS. 17 and 18, the supporting pin 150 is located at the lowermost row of the sixth engagement groove 146 for causing rotation of the disc table supporting member 104 in the direction of arrow $X_{14}$ in FIG. 18 for spacing the disc table 101 apart from the damper 102.

Meanwhile, the disc rotating operating mechanism 100 is rigidly held by the main body portion of the apparatus 2 after the main power source of the disc player 1 is turned off. Specifically, this is achieved by the slider 135 being secured to the stationary member 151 by which the disc rotating operating mechanism 100 is secured to the bottom surface of the main body portion of the apparatus 2. This stationary member 151 is mounted in the vicinity of the slider 118 and has, on its lateral side edge, lock openings 154, 155 formed in a pair of upstanding wall sections 152, 153. The stationary member 151 has a pair of upstanding second wall sections 156, 157 substantially parallel to the first upstanding wall sections 152, 153. In these upstanding second wall sections 156, 157 are formed cut-outs 158, 159.

Figure 20:
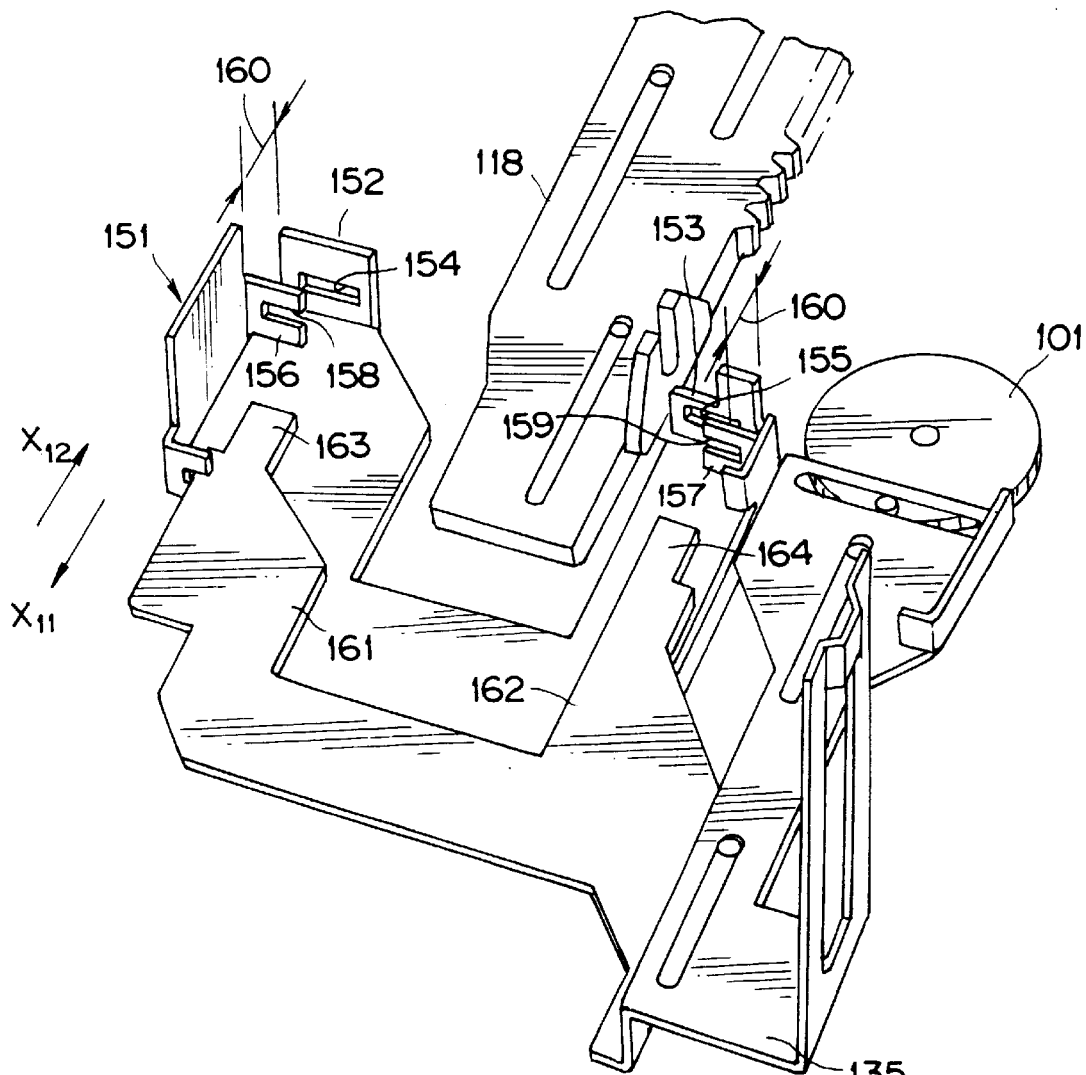
FIG. 20 is a perspective view showing a holding mechanism for holding the disc reproducing unit.

The slider 135 is provided for traversing the overlying disc rotating operating mechanism 100 and is provided with a first arm 161 and a second arm 162. The first arm 161 is provided at its distal end with a first lug 163 engaging in the lock opening 154 and in the cut-out 158, while the second arm 162 is provided at its distal end with a second lug 164 engaging in the lock opening 155 and in the cut-out 159. The slider 135 is moved in the direction indicated by arrows $X_{11}$ or $X_{12}$ in FIGS. 17, 18 and 20, when clamping the optical disc 105, as explained in detail with reference to FIGS. 17 and 18.

Figure 21:
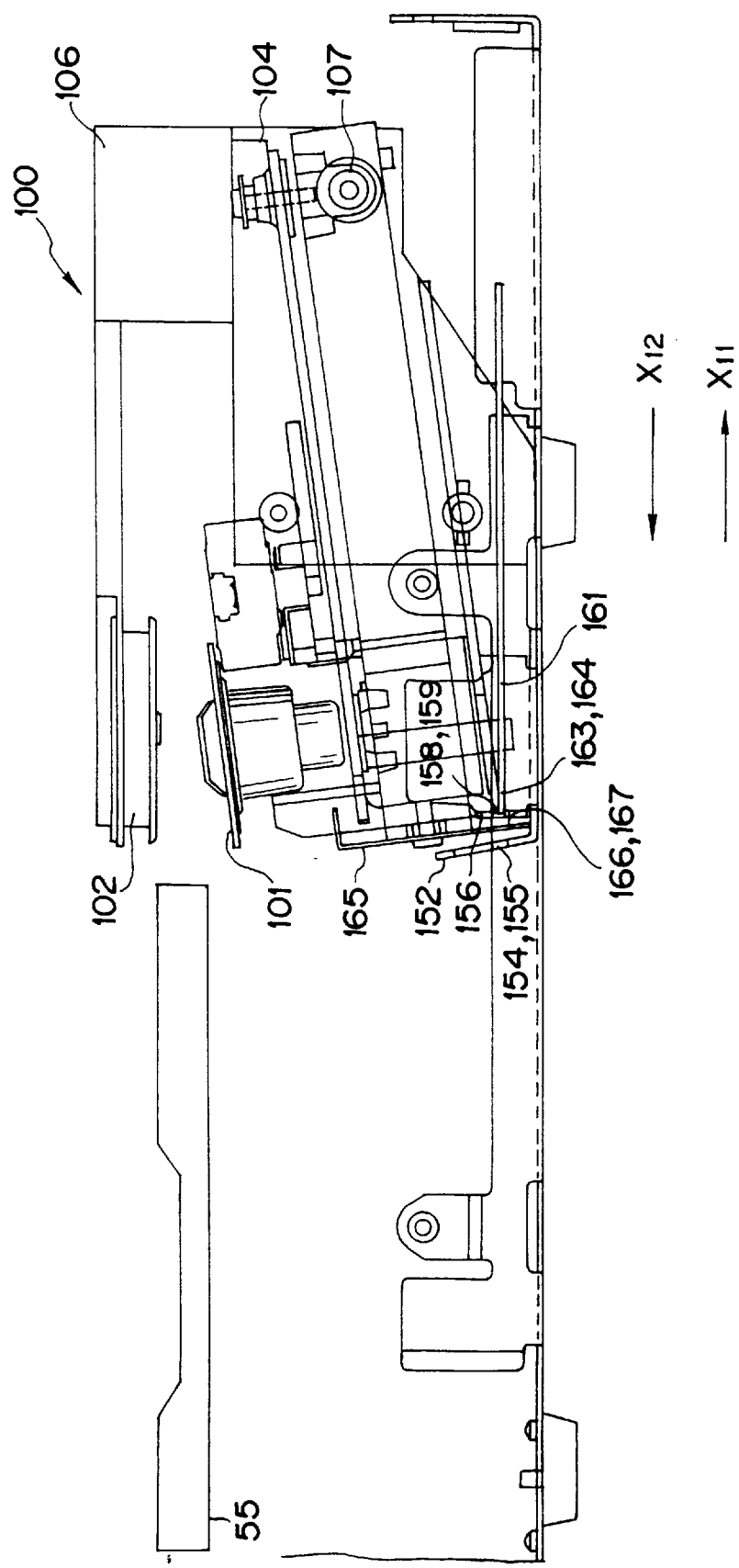
FIG. 21 is a side view of a disc player showing the disc reproducing unit separated from the holding mechanism.
Figure 22:
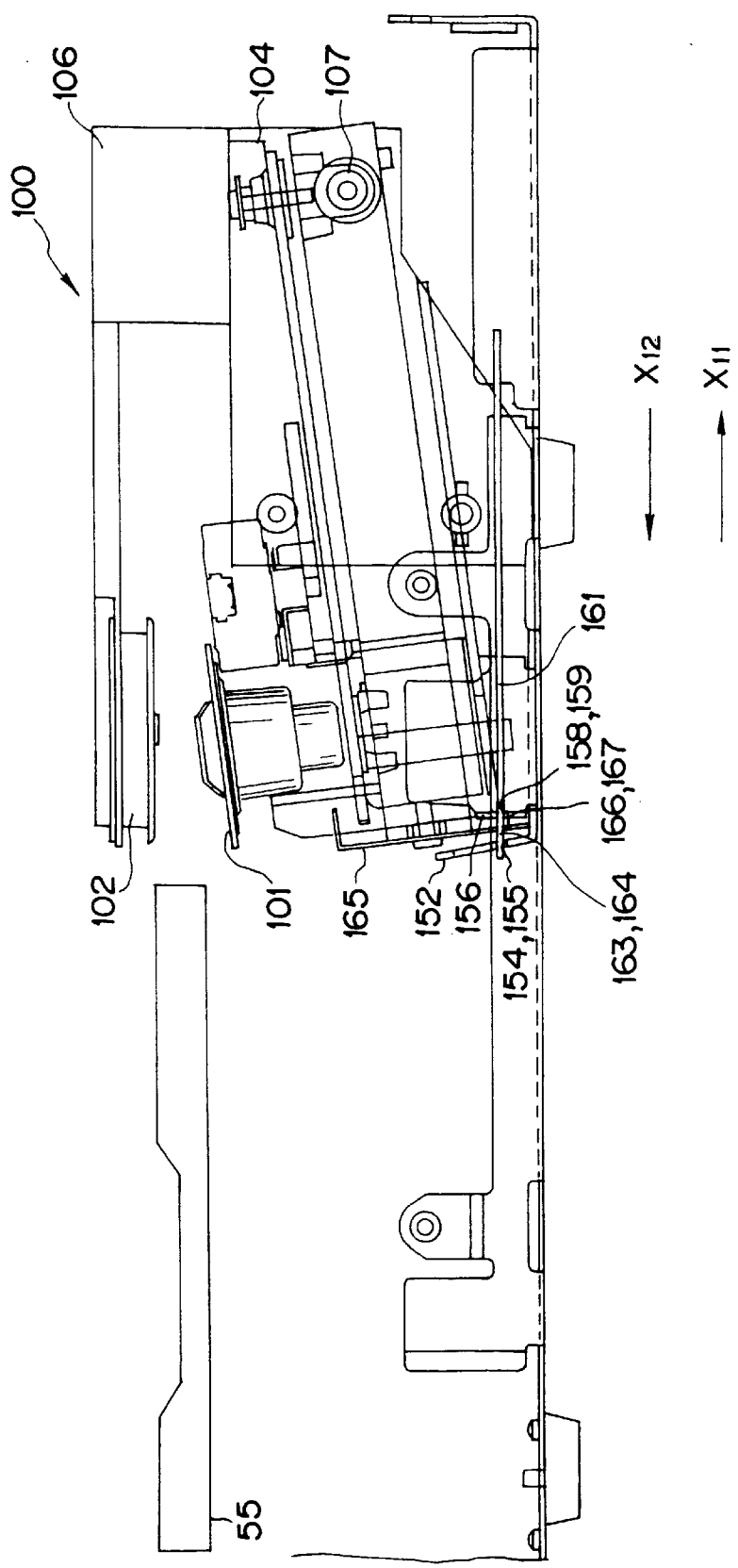
FIG. 22 is a side view of a disc player showing the disc reproducing unit held by the holding mechanism.

The disc rotating operating mechanism 100 is fitted on its front side with a reinforcement plate 165, as shown in FIGS. 21 and 22. The reinforcement plate 165 has engagement openings 165, 166 which are engaged by the first and second lugs 163, 164. This reinforcement plate 165 is inserted into a spacing defined by the upstanding first wall sections 152, 153 and the upstanding second wall sections 156, 157.

When the disc rotating operating mechanism 100 is positioned at a height level corresponding to the lowermost stage in register with the third disc tray 5, the slider 135 is receded in the direction indicated by arrow $X_{11}$ in FIG. 21, such that the first and second lugs 163, 164 are not engaged in the lock openings 154, 155 nor in the engagement openings 166, 167 of the reinforcement plate 165. If, in this state, the slider 135 is moved in the direction indicated by arow $X_{11}$ in FIGS. 21 and 18, the disc table supporting member 104 is moved in the direction indicated by arrow $X_{13}$ in FIG. 18 for clamping the optical disc 105, as described previously.

When the main power source of the disc player 1 is turned off, the disc rotating operating mechanism 100 is fixed and held by the main body portion of the apparatus 2. That is, the disc rotating operating mechanism 100 is moved in the direction of arrow $X_{12}$ in FIG. 22, such that the first and second lugs 163, 164 are engaged in the engagement openings 166, 167 and the lock openings 154, 155 formed in the reinforcement plate 165 mounted on the disc rotating voperating mechanism 100. Since the slider 135 is moved in this state in the direction of arrow $X_{12}$ in FIG. 18, the disc table supporting member 104 is rotated in the direction $X_{14}$ in FIG. 18 such that the disc table 101 is separated from the disc damper 102, that is the optical disc 105 cannot be clamped, as described previously.

Thus, with the disc rotating operating mechanism 100, if the main power source of the disc player 1 is turned off, the disc rotating operating mechanism 100 is automatically fixed and held by the stationary member 151 of the main body portion of the apparatus 2. Thus, even if an impact is applied in the course of transport of the disc player 1, there is no risk of destruction of the disc rotating operating mechanism 100 or the driving system, such as the lifting mechanism, of the disc rotating operating mechanism 100 by the impact. In addition, the reinforcement plate 165 mounted on the disc rotating operating mechanism 100 is inserted into a gap 160, while the first and second lugs 163, 164 are engaged in the cut-outs 158, 159 for assuring sufficient strength. Also, since the disc rotating operating mechanism 100 is fixed and held in the stationary member 151 provided on the bottom surface of the main body portion of the apparatus 2, locking is achieved in a more stable state as compared to the case in which the disc rotating operating mechanism 100 is secured at an upper position. Moreover, since the disc rotating operating mechanism 100 is locked in the state in which the optical disc 105 held by the third disc tray 5 is not clamped, there is no inconvenience such that malfunctions occur with the optical disc remaining housed in the apparatus.

Figure 23:
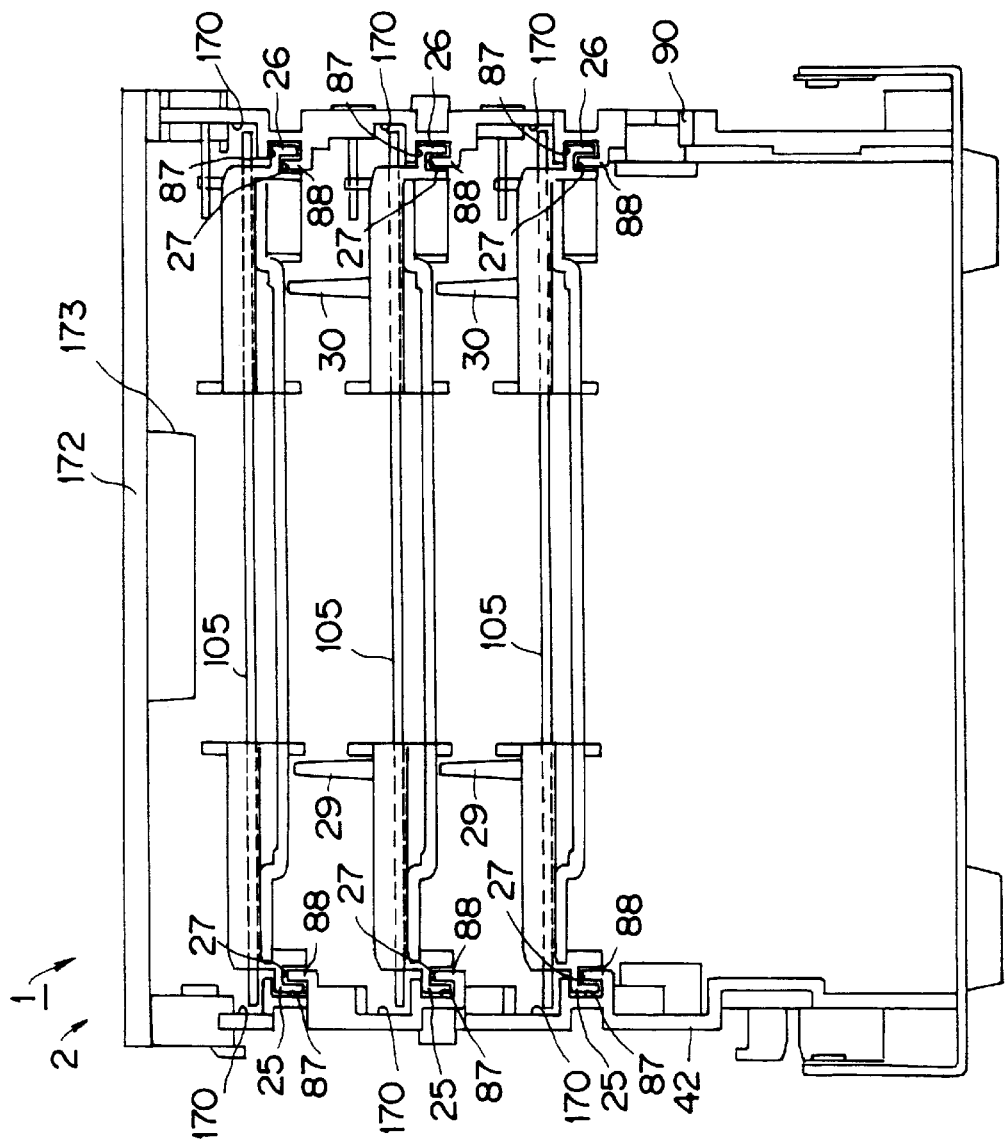
FIG. 23 is a front view showing the optical disc holding unit.

The disc player 1, thus arranged, has its width subsequently equal to the diameter of the optical disc which is 12 cm. The disc player 1 is arranged so that the optical disc is not popped out from the first to third disc trays 3 to 5. Specifically, the arrangement is made as shown in FIG. 23.

That is, the second and third disc trays 4, 5 are provided with supporting pins 29, 30, for preventing the optical disc from being detached from the disc trays 4, 5 if the apparatus becomes tilted with the optical disc being set on the disc trays 4, 5 and with the resulting assembly of the disc trays and the disc being housed in the main body portion of the apparatus 2. The height of the supporting pins 29, 30, 30, set upright on the third disc tray 5, is the height up to the bottom surface of the second disc tray 4, which is the upper tier, while that of the supporting pins 29, 30, 30 set upright on the second disc tray 4 is up to the first disc tray 3.

These supporting pins 29, 30, perform the role of preventing the optical disc from being moved towards the side of the disc reproducing unit 10 corresponding to the inner side of the main body portion of the apparatus 2. Therefore, the spacing between these supporting pins 29, 30 is set so as to be narrower than the diameter of 8 cm of the optical disc set on the second disc setting portion 22.

Meanwhile, the first disc tray 3 is not provided with these supporting pins 29, 30, as described above. A top plate 172 is mounted above the first disc tray 3, while a protrusion 173 is provided in register with the supporting pins 29, 30, 30 provided on the second and third disc trays 4, 5 for preventing the optical disc set on the first disc tray 3 from being moved towards the inside of the main body portion of the apparatus 2. This protrusion 173 is formed of an elastic material for preventing the optical disc 105 from being damaged on contact thereof with the optical disc 105. The protrusion 173 is subsequently of the same height as the separation from the top plate 172 to the first disc tray 3.

The first to third disc trays 3 to 5 are mounted in position by having the ribs 25, 26 engaged in the recess 87 and the tray guide groove 91 formed in both sidewall sections 42, 90. At this time, the lugs 88 provided in the guide grooves 87, 91 are engaged in the recessed grooves 27 of the first to third disc trays 3 to 5. In the sidewall sections 42, 90, a second guide groove 170 is formed between the guide groove 87 for guiding the first disc tray 3 and the guide groove 87 for guiding the second disc tray 4. Similarly, a second guide groove 170 is formed between the guide groove 87 for guiding the second disc tray 4 and for guiding the third disc tray 5. The portion of the outer periphery of the optical disc 105 set on the first to third disc trays 3 to 5 protruded from the cut-out 24 formed in the first to third disc trays 3 to 5 is abutted against the sidewall section of the second guide groove 170 to limit the movement in the left-and-right direction. The second guide groove 170 limits the movement in the up-and-down direction by its top plate. Meanwhile, the movement of the optical disc 105 in the up-and-down direction can also be adapted for being limited by a lug provided on the sidewall section of the second guide groove 170 in addition to being limited by the top plate of the second guide groove 170.

In this manner, the optical disc is limited in its movement in the up-and-down direction and in the left-and-right direction by the protrusion 173 provided on the top plate 172 of the main body portion of the apparatus 2 and by the sidewall section of the second guide groove 170 provided in the sidewall sections 42, 90, while being limited in its movement towards the inside of the main body portion of the apparatus by the supporting pins 29, 30. Thus, the movement of the optical disc can be limited without increasing the size of the entire apparatus. For setting the width of the first to third disc trays 3 to 5 so as to be smaller than the diameter of the optical disc, the disc trays 3 to 5 are provided with cut-outs 24 adapted for partially exposing the outer rim of the optical disc to outside. Since the optical disc is limited in its movement in the up-and-down direction and in the left-and-right direction by the protrusion 173 provided on the top plate 172 of the main body portion of the apparatus 2 and the sidewall section of the second guide groove 170 in the sidewall sections 42, 90 and the top plate 172, while being limited in its movement towards the inside of the main body portion of the apparatus by the supporting pins 29, 30, the optical disc can be protected reliably.

Figure 24:
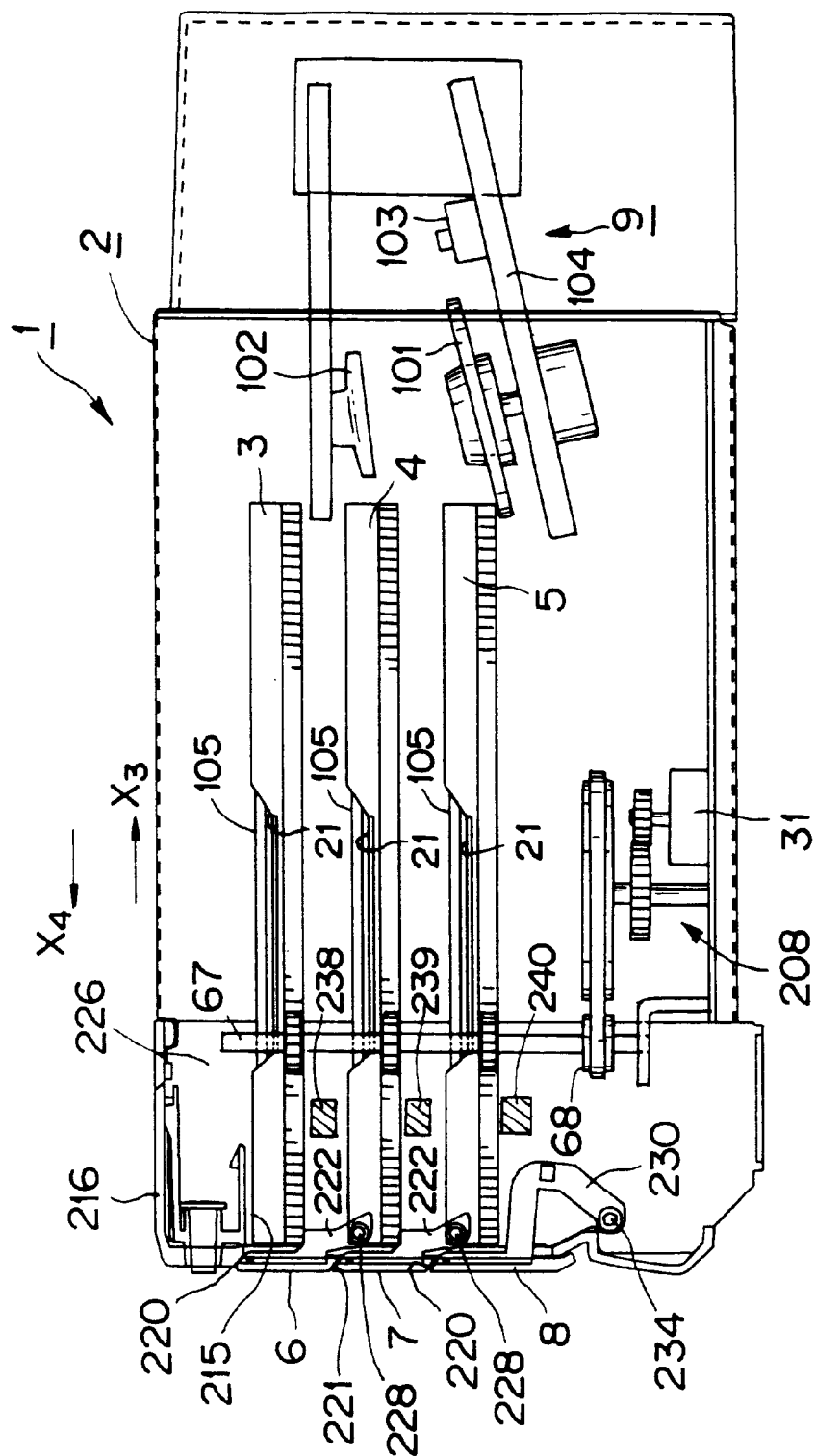
FIG. 24 is a side view of a disc player showing the relation between the disc tray and the opening.

In the front side of the main body portion of the apparatus 2 carrying the first to third disc trays 3 to 5 and the disc reproducing unit 10 is formed an opening 215 for selectively drawing out the first to third disc trays 3 to 5. Specifically, the opening 215 is formed in the front panel 216 mounted on the front side of the main body portion of the apparatus 2, as shown in FIGS. 1 and 24. This opening 215 is formed in a square sized to encircle the front side of the first to third disc trays 3 to 5 overlapped in the up-and-down direction.

On the front panel 216 are rotatably mounted first, second and third lids 6, 7 and 8, as shown in FIGS. 1 and 24. These first, second and third lids 6, 7 and 8 are mounted on the front panel 216 for facing the first to third disc trays 3 to 5 arranged overlapped in the main body portion of the apparatus 2.

The first, second and third lids 6, 7 and 8 are rectangular-shaped having a long side corresponding to the direction of width of the main body portion of the apparatus 2 and are arrayed side-by-side in the up-and down direction of the main body portion of the apparatus 2, as shown in FIG. 1. At this time, the lids 6 to 8 are mounted on the front panel 216 so that the lids are partially overlapped with one another, as shown in FIGS. 1 and 24. That is, the lids 6 to 8 are overlapped such that the upper edge of the second lid 7 disposed at the center is partially overlapped with the lower edge of the first lid 6 disposed at the upper most position of the main body portion of the apparatus 2, as shown in FIG. 1. Also, part of the upper edge of the third lid 8 disposed at the lowermost side of the main body portion of the apparatus 2 is overlapped with the lower edge of the second lid 7 disposed at the center, as shown in FIG. 1. That is, the upper end of the second lid 7 disposed at the lower end is overlapped with the lower edge of the first lid 6, while the upper edge of the third lid 8 disposed at the lowermost position is overlapped with the lower end of the second lid 7.

The upper edges and the lower edges of the first, second and third lids 6, 7 and 8 overlapped with one another are formed with inclined surface sections 220, 221. These inclined surface sections 220, 221 assure relative smooth rotation of the first or second lid 6 or 7 overlapped with the lids 7 to 8. The inclined surface sections 220, 221 are desirably formed arcuately in meeting with the rotational trajectory of the first, second and third lids 6, 7 and 8 for assuring smooth rotation of these lids 6 to 8.

Figure 25:
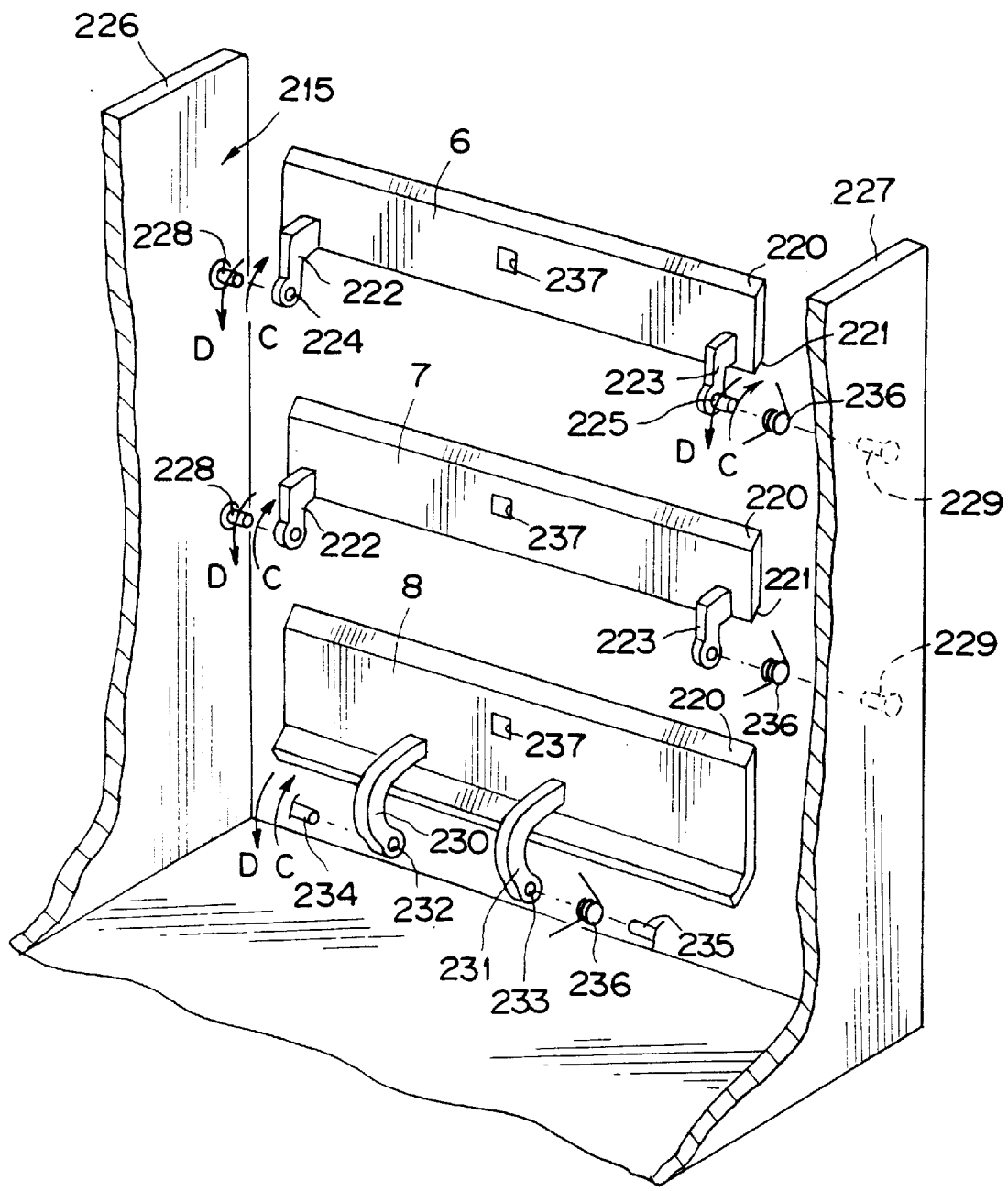
FIG. 25 is a perspective view showing a lid adapted for opening/closing the opening.

For enabling rotation of the first, second and third lids 6, 7 and 8, arranged overlapped in the up-and-down direction, the fulcrum points of rotation of the lids 6 to 8 are provided on both lower sides of the lids 6 to 8. On the first and second lids 6, 7 are set upright a pair of rotary arms 222, 223 for depending from both lower rear surfaces, as shown in FIG. 25. The distal ends of the rotary arms 222, 223 of the first and second lids 6, 7 are formed with fulcrum holes 224, 225 engaged by supporting shafts 228, 229 protuberantly formed on the inner lateral sides of facing sidewall sections 226, 227 of the front panel 216. Thus, the lids 6, 7 are supported for rotation in the direction of arrows C and D for opening or closing the opening 215 about the supporting shafts 228, 229 as center of rotation. The third lid 8 is formed with a pair of protuberant subsequently L-shaped rotary arms 230, 231, the distal ends of which are formed with fulcrum holes 232, 233 engaged by supporting shafts 234, 235 formed on the back side of the lower end of the front panel 216. The third lid 8 is supported for rotation in the directions of arrows C and D in FIG. 25 for opening/closing the opening 215 about the supporting shafts 234, 235 as the center of rotation.

The first, second and third lids 6, 7 and 8 are supported by supporting shafts 229, 235 carrying a torsion coil spring 236 retained between the lids 6 to 8 and the front panel 216. The torsion coil spring 236 rotationally biases the lids 6 to 8 perpetually in the direction of arrow D in FIG. 3 of closing the opening 15.

At the center of the first, second and third lids 6, 7 and 8 is formed a transparent window section 237 which permits the first to third disc trays 3 to 5 arranged in the main body portion of the apparatus 2 in meeting with the lids 6 to 8 to be seen through from the outside, as shown in FIG. 1. The surface sides of the first, second and third lids 6, 7 and 8 of the first, second and third lids 6, 7 and 8 are used as display surfaces 6a, 7a, 8a for making display of the addresses or other indications for the first to third disc trays 3 to 5 in association with the lids 6 to 8.

Since the first, second and third lids 6, 7 and 8 are arranged partially overlapped with one another in a manner of closing the opening 215, a sufficient height can be assured while the size of the opening 215 for reciprocation of the disc trays 3 to 5 is decreased, thus assuring a large surface measure of the display surfaces 6a, 7a, 8a.

On the inner side of the opening 215 are mounted supporting arms 238, 239 and a supporting base block 240 configured for horizontally supporting the first to third disc trays 3 to 5 when the disc trays 3 to 5 are pulled outwardly from the main body portion of the apparatus 2, as shown in FIG. 24.

The movement of the first, second and third lids 6, 7 and 8 rotated in association with the movement of the first to third disc trays 3 to 5 is hereinafter explained.

Figure 26:
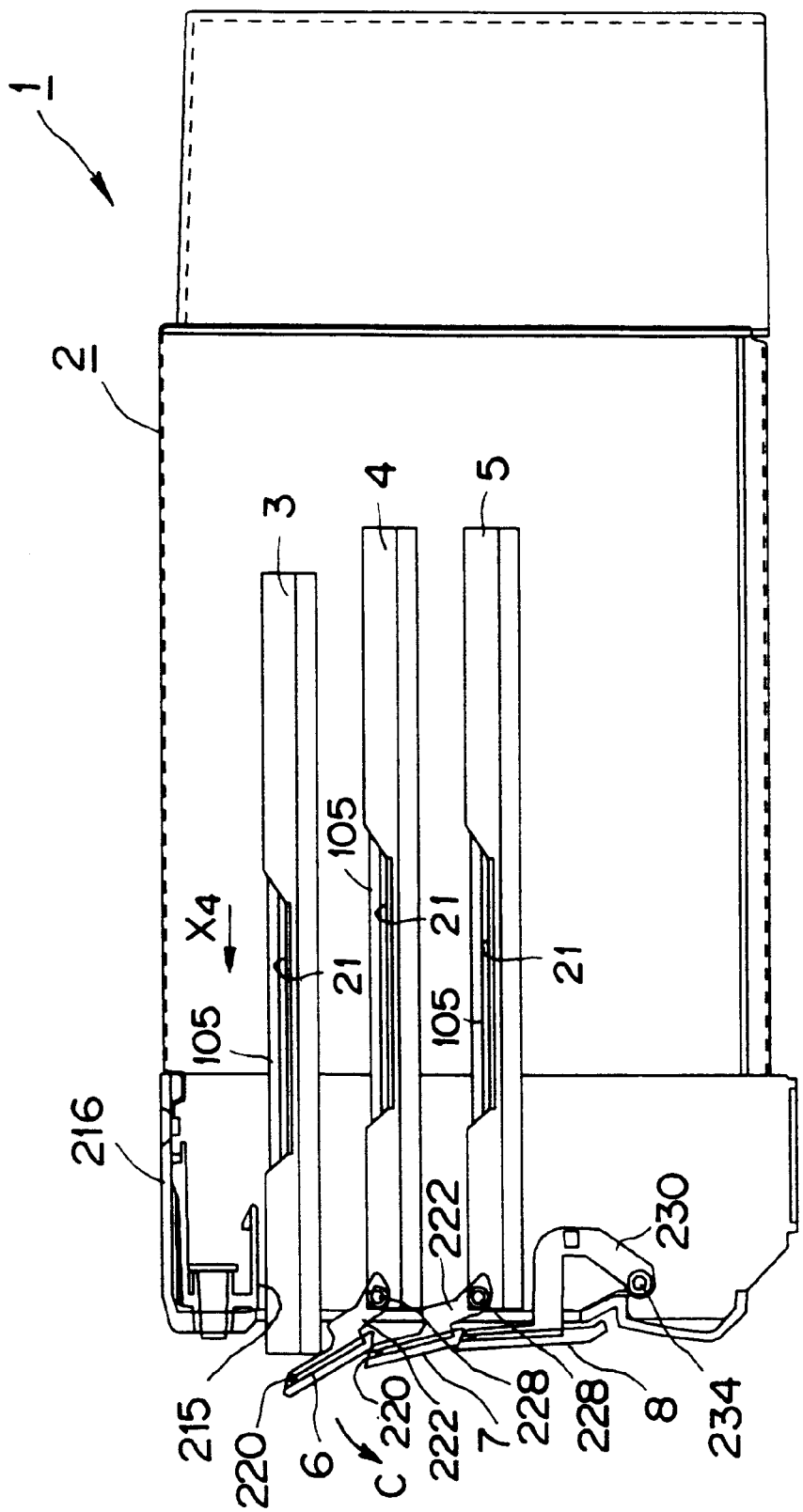
FIG. 26 is a side view showing the state of extracting the disc tray at the uppermost tier in the main body portion of the apparatus.
Figure 27:
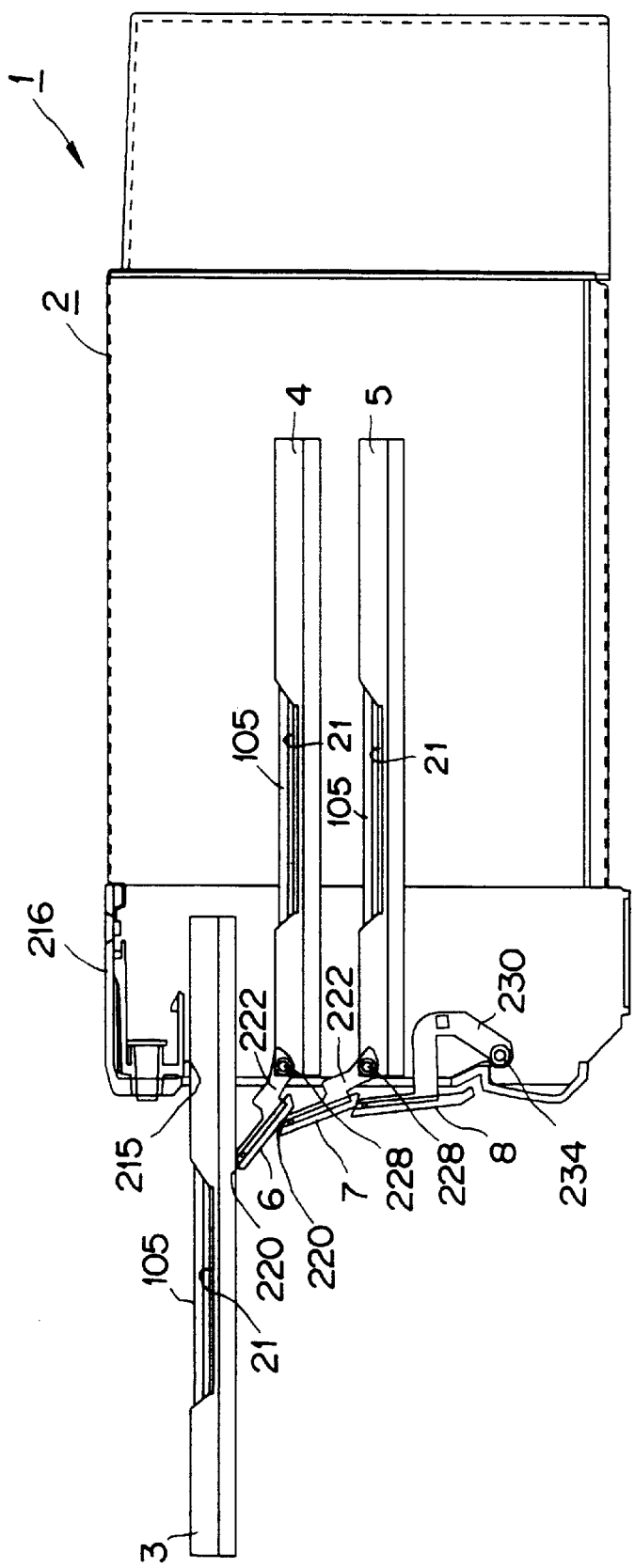
FIG. 27 is a side view showing the state in which the disc tray at the uppermost tier has been extracted from the inside of the main body portion of the apparatus.

First, if the first disc tray 3 disposed at the uppermost position in the main body portion of the apparatus 2 is moved by a tray driving mechanism 208 in a direction proceeding towards outside of the main body portion of the apparatus 2 in a direction indicated by arrow $X_4$ in FIG. 26, the first lid 6 is thrust by the distal end of the first disc tray 3. If the first lid 6 is thrust by the first disc tray 3, the lid 6 is rotated against the force of a torsion coil spring 236, in the direction indicated by arrow C in FIG. 26, about the supporting shafts 228, 229 as the center of rotation, for opening the opening 215. The first disc tray 3 is protruded via the opened opening 215 to a position in which the first disc setting section 21 holding the optical disc is exposed to outside of the main body portion of the apparatus 2 for permitting loading/unloading of the optical disc 2 or 105. At this time, the first lid 6 is thrust and supported by the bottom surface of the first disc tray 3, as shown in FIG. 27, so as to be held at a position of opening the opening 215 against the force of the torsion coil spring 236. When the first lid 6 is rotated in the direction of opening the opening 215, the second lid 7 overlapped with the first lid 6 and the third lid 8 overlapped with the second lid 7 are also rotated against the force of the torsion coil spring 236, in a direction indicated by arrow C in FIG. 27, about the supporting shafts 228, 229 and 234, 235 as the center of rotation. The second and third lids 7, 8 are rotated with rotation of the first lid 6. However, since the lids 6 to 8 are overlapped with one another, the opening 215 is not opened completely. Moreover, since the first disc tray 3 is extended over the second and third lids 7 and 8, the hand or finger may be prevented from being inserted via the opening 215, thus assuring protection of the other disc trays 4, 5 or other portions disposed in the main body portion of the apparatus 2.

When the first disc tray 3 pulled out of the main body portion of the apparatus 2 is moved in the direction of arrow $X_3$ in FIG. 27 so as to be pulled into the inside of the main body portion of the apparatus 2, the lids 6 to 8 are rotated, in association with the movement of the first disc tray 3, under the bias of the torsion coil spring 236, in a direction of arrow D in FIG. 26. When the first disc tray 3 is pulled completely into the main body portion of the apparatus 2, the lids 6 to 8 are rotationally restored to a position of closing the opening 215 under the bias of the torsion coil spring 236.

Figure 28:
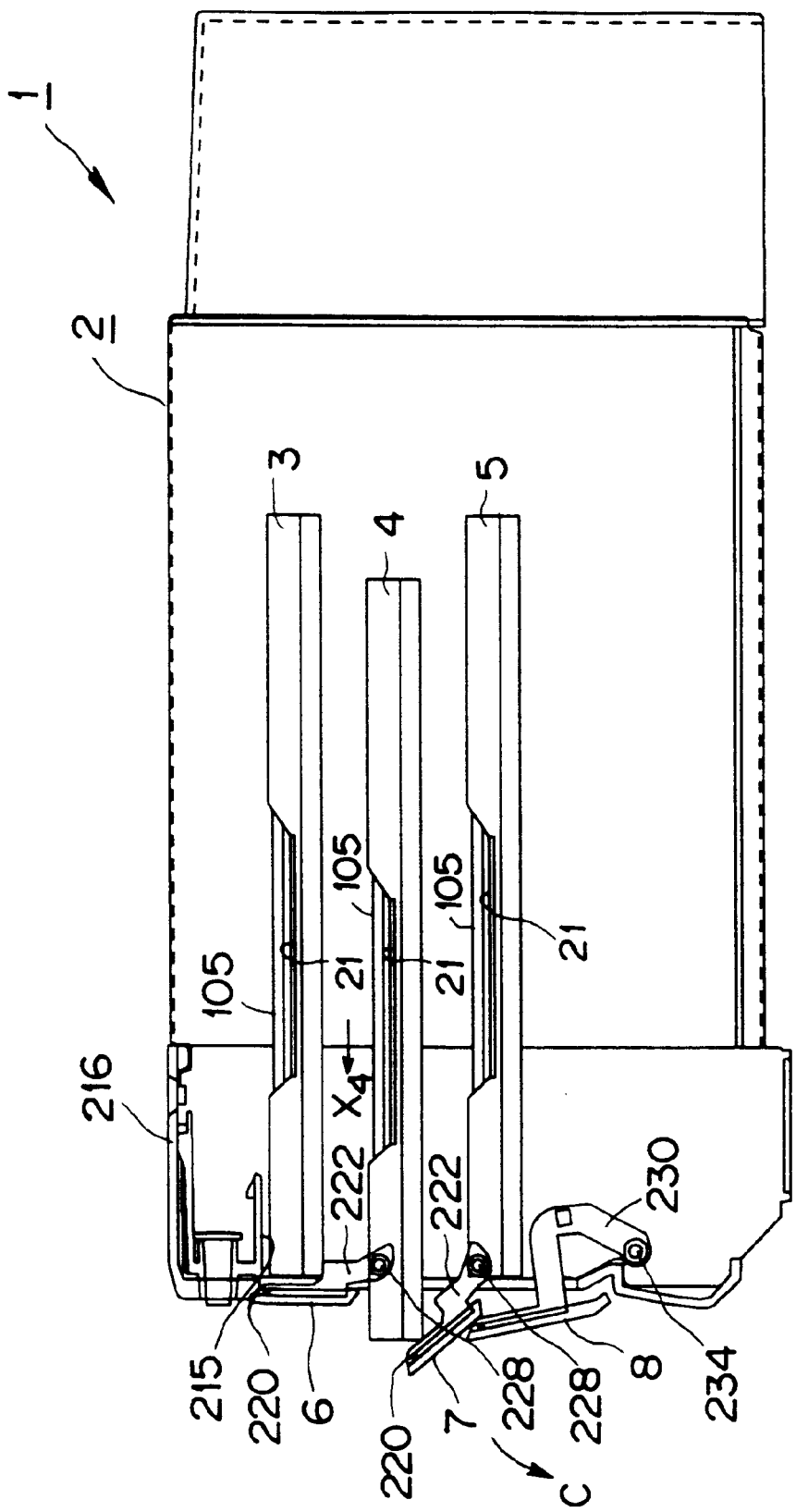
FIG. 28 is a side view showing the state of extracting a disc tray at a mid height position from the main body portion of the apparatus.
Figure 29:
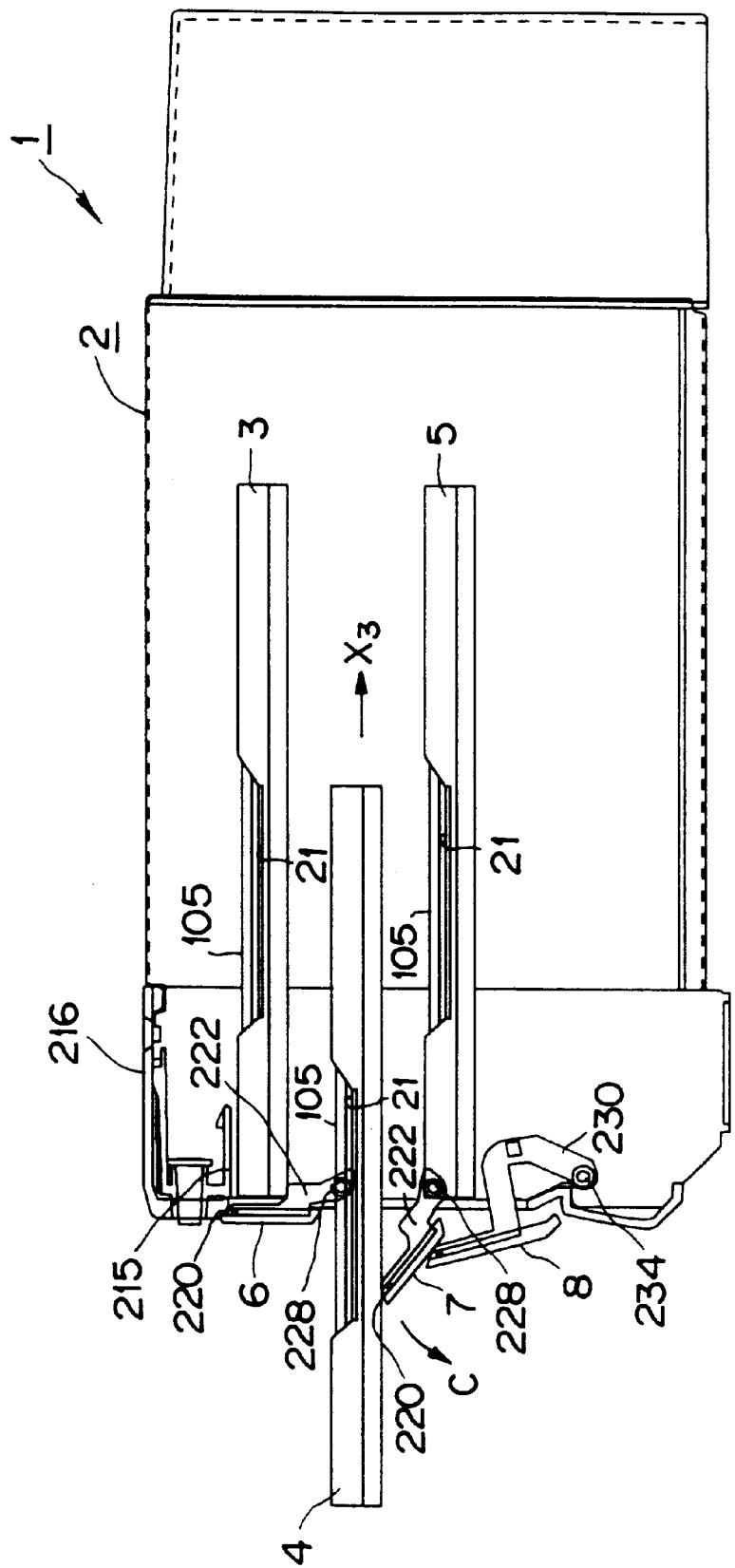
FIG. 29 is a side view showing the state in which a disc tray at a mid height position has been extracted from the main body portion of the apparatus.

When the second disc tray 4 at an intermediate position in the main body portion of the apparatus 2 is moved by the tray driving mechanism 208 in a direction towards outside of the main body portion of the apparatus 2, as indicated by arrow A in FIG. 28, the second lid 7 is thrust by the distal end of the second disc tray 4. When thrust by the disc tray 4, the second lid 7 is rotated in the direction of arrow C in FIG. 28, about the supporting shafts 228, 229 as the center of rotation, for opening the opening 236 against the bias of the torsion coil spring 236. The second disc tray 4 is protruded, via the opened opening 215, to a position in which the first disc setting section 21 holding the optical disc 105 faces to the outside of the main body portion of the apparatus 2 for permitting insertion and detachment of the optical disc 105, as shown in FIG. 29. At this time, the second lid 7 is thrust and supported by the bottom surface of the second disc tray 4 so as to be held at the position of opening the opening 215 against the bias of the torsion coil spring 236. If the second lid 7 is rotated in the direction of opening the opening 215, the third lid 8, overlapped with the second lid 7, is also rotated in the direction of arrow C in FIG. 29, about the supporting shafts 234, 235 as the center of rotation, against the bias of the torsion coil spring 236. Since the first lid 6 is not thrust by the second lid 7, the lid 6 is held at the position of closing the opening 215.

If the second disc tray 4, pulled outwardly from the main body portion of the apparatus 2, is moved in the direction of arrow $X_3$ in FIG. 27 so as to be pulled into the inside of the main body portion of the apparatus 2, the second and the third lids 7, 8 are rotated, under the bias of the torsion coil spring 236, in association with the movement of the second disc tray 4, in a direction of arrow D in FIG. 27. When the second disc tray 4 is completely pulled into the inside of the main body portion of the apparatus 2, the lids 7, 8 are rotationally restored, under the bias of the torsion coil spring 236, to the position of closing the opening 215.

Figure 30:
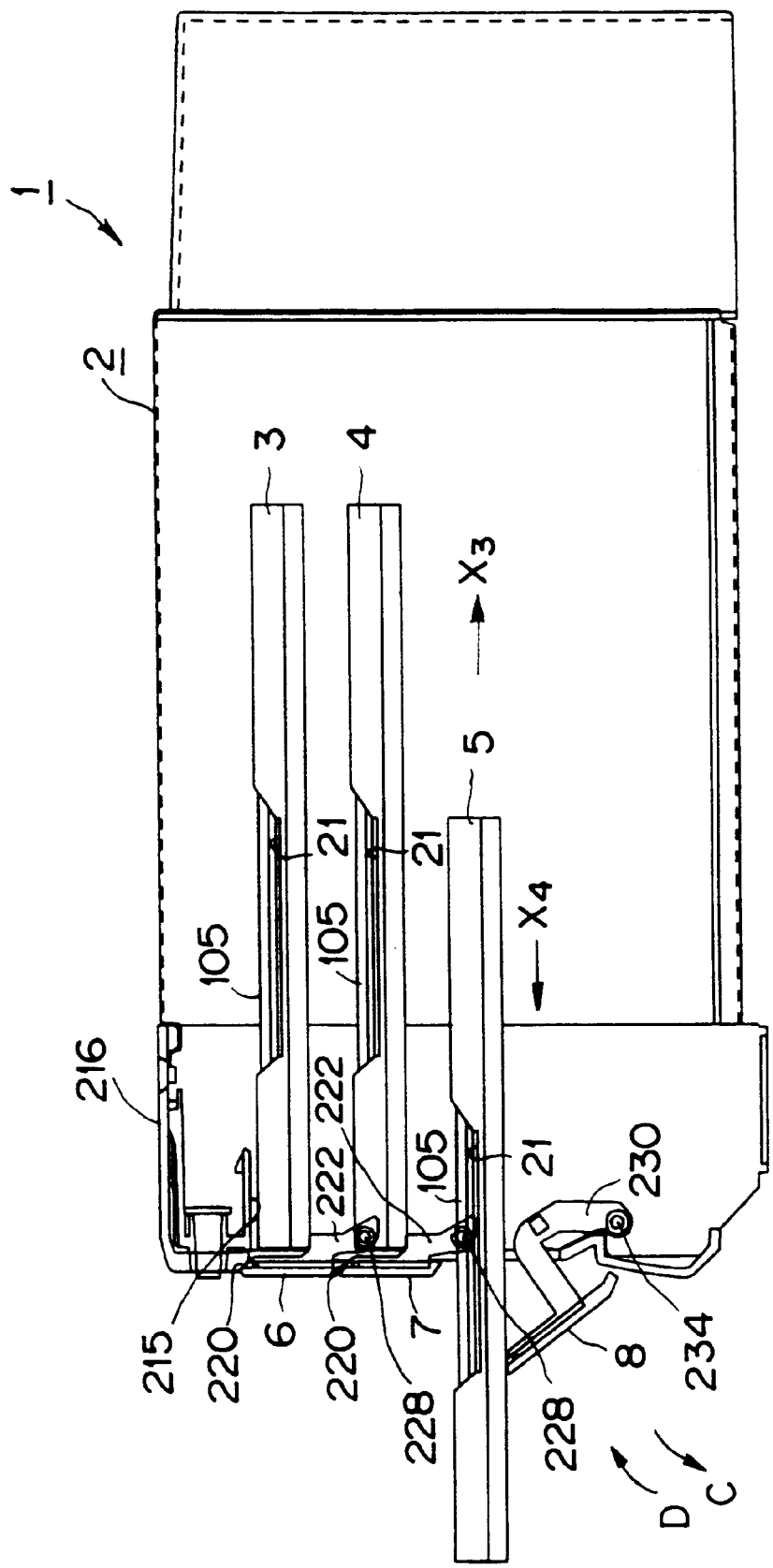
FIG. 30 is a side view showing the state in which a disc tray at the lowermost tier has been extracted from the main body portion of the apparatus.

When the third disc tray 5 at the lowermost position in the main body portion of the apparatus 2 is moved in a direction towards outside of the main body portion of the apparatus 2, as indicated by arrow $X_4$ in FIG. 30, the third lid 8 is thrust by the distal end of the third disc tray 5. If the third lid 8 is thrust by the third disc tray 5, the third lid 8 is rotated against the bias of the torsion coil spring 236 in the direction of arrow C in FIG. 30, about the supporting shafts 234, 235 as the center of rotation, for opening the opening 215. The third disc tray 5 is protruded, via the opened opening 215, to a position in which the first disc setting section 21 carrying the optical disc 105 faces to the outside of the main body portion of the apparatus 2 for enabling insertion/detachment of the optical disc 105, as shown in FIG. 30. At this time, the third lid 8 is thrust and supported by the bottom surface of the third disc tray 5, as shown in FIG. 30, so as to be held at the position of opening the opening 215 against the bias of the torsion coil spring 236. Since the first and second lids 6, 7 are not thrust by the third lid 8, the lids 6, 7 are held at the position of closing the opening 215.

In this case, if the third disc tray 5 pulled outwardly from the main body portion of the apparatus 2 is moved in the direction of arrow $X_3$ in FIG. 30 so as to be pulled into the inside of the main body portion of the apparatus 2, the third lid 8 is rotated in association with the movement of the third disc tray 5 in the direction of arrow D in FIG. 30 for closing the opening 215 under the bias of the torsion coil spring 236. When the third disc tray 5 is completely pulled into the main body portion of the apparatus 2, the third lid 8 is rotationally restored to the position of closing the opening 215 under the bias of the torsion coil spring 236.

The first, second and third lids 6, 7 and 8 are overlapped with one another in the up-and-down direction in which the first to third disc trays 3 to 5 are arrayed, and are rotatably mounted about the lower fulcrum point, as described above. Thus, if the first or second lids 6, 7 disposed at an upper position are rotated and the second or third lids 7 or 8 disposed at the lower side are rotated, for partially opening the opening 215, there is no risk of the foreign matter being intruded into the main body portion of the apparatus 2 because the disc trays 4, 5 are at an upper position.

The state of exchanging the optical disc held by the first to third disc trays 3 to 5 housed within the disc player according to the present invention is hereinafter explained.

It is herein assumed that the optical disc held by the first disc tray 3 is exchanged.

When moving the first disc tray 3 at the stand-by position in the main body portion of the apparatus 2 to the disc exchange enabling position, the first disc tray 3 at an address 1 is selected. The first gear 45 of the disc tray selection mechanism is rotated in the direction indicated by arrow $X_1$ in FIG. 7 into meshing with the second ear 46 to enable the slider 60 mounted on the driving power transmitting member 50 to be moved in the directions $X_3$ or $X_4$ in FIG. 7. If the driving motor 32 as the driving source of the disc tray selection mechanism is driven, the driving motor 32 sets a condition in which the slider 60 has selected the first disc tray 3. That is, by the movement of the slider 60, only the first counter gear 68 meshes with the third gear 37 mounted on the first driving shaft 41 to select the first disc tray 3 at the address 1 (position B) as shown in FIG. 6. When the driving motor 31 is run in rotation, the first driving shaft 41 and hence the third gear 37 are run in rotation. Thus, the first counter gear 68 meshing with the third gear 37 is run in rotation. Then, by the disc tray selection mechanism, to which the driving power is transmitted from the first counter gear 68, as shown in FIG. 10, the first disc tray 3 is moved to the disc exchange enabling position protruded from the main body portion of the apparatus 2 shown in FIG. 27. The first disc tray 3 now exchanges the optical disc set on the first disc tray 3.

After the end of the optical disc, the first disc tray 3 is moved from the disc exchange enabling position to the stand-by position. That is, if the driving motor 32 is driven, the first disc tray 3 is moved by the disc tray selection mechanism to its stand-by position.

For reproducing the optical disc set on the first disc tray 3 at the address 1, the operation is as follows: If the first disc tray 3 at the address 1 is selected, the disc reproducing unit 10 is lifted to a height in register with the disc tray 3. Specifically, should the disc tray 3 at the address 1 be selected, as shown in FIG. 14 and 15, the driving motor 33 is run in rotation for moving the slider 118 in the directions indicated by arow $X_5$ in FIGS. 14 and 15. The rotary arm 120 is then run in rotation in the direction indicated by arrow $X_8$ in FIG. 15, about the supporting portion 125 as the center of rotation, at the same time as the mounting pin 127 is moved in the direction of arrow $X_9$ in FIG. 15 for lifting the disc rotating operating mechanism 100 to a height in register with the disc tray 3.

The first disc tray 3 is then moved by the disc tray driving mechanism shown in FIG. 10 from the stand-by position to the reproducing position so as to be clamped by the disc rotating operating mechanism 100. The first gear 45, connected to the driving motor 32, is then run in rotation in the direction indicated by arrow $X_2$ in FIG. 17, into meshing with the second gear 130. Turning to the clamp mechanism, if the driving motor 32 is driven so that the slider 135 is moved in the direction indicated by arrow $X_{11}$ in FIG. 17 and 18, the supporting pin 150 is positioned at an upper tier in the sixth engagement groove 146, such that the disc table supporting member 104 is rotated in the direction indicated by arrow $X_{13}$ in FIG. 18 to clamp the optical disc 105. The optical disc is now clamped between the disc table 101 and the damper 102 and thus enabled to be rotated in unison with the disc table 101. By rotating the disc table 101 and by moving the optical pickup device 103 along the radius of the optical disc 105, the information signals can be reproduced from the optical disc 105.

If, when the first disc tray 3 is moved from the playback position to the standby position, the driving motor 32 of the lift mechanism is driven to move the slider 135 in the direction indicated by arrow $X_{12}$ in FIGS. 17 and 18, the supporting pin 150 is located at the lower step of the sixth guide groove 146 in FIG. 18, with the disc table supporting member 104 being rotated in the direction indicated by arrow $X_{14}$ in FIG. 18, with the disc table 101 being spaced apart from the disc clamper 102. This causes the disc tray driving mechanism shown in FIG. 10 to move the disc tray 3 from the playback position to the standby position.

With the above-described disc player 1, if one of the first to third disc trays 3 to 5 is at the playback position, the optical discs set on the remaining optical discs can be exchanged. In this case, the first gear 45 connected to the driving motor 32 is run in rotation in the direction indicated by arrow $X_1$ in FIG. 17 into meshing with the first gear 46 to enable the slider 60 mounted on the driving power transmitting member 50 to be moved in the directions indicated by arrows $X_3$ or $X_4$ in FIG. 7. If the driving motor 32 as the driving source of the disc tray selection mechanism is driven, the driving motor 32 moves the slider 60 to select the disc tray the optical disc of which is to be exchanged. If the driving motor 31 is driven, the first driving shaft 41 and hence the third, fourth and fifth gears 37, 38 and 39 are run in rotation such that the third to fifth gears 37, 38 and 39 are engaged with one of the first to third counter gears 68 to 70. Then, such one of the first to third disc trays 3 to 5 is moved between the disc exchange enabling position protruded from the main body portion of the apparatus 2 and the stand-by position by the disc tray driving mechanism, to which the driving power has been transmitted from the first counter gear 68.

If the main power source is turned off, the state of the disc rotating operating mechanism 100 is such that the slider 135 is moved in the direction of arrow $X_{12}$ in FIG. 22 and the first and second lugs 163, 164 are engaged in the engagement openings 166, 167 and in the lock openings 154, 155 in the reinforcement plate 165 mounted on the disc rotating operating mechanism 100. Thus, it is possible to prevent the disc rotating operating mechanism 100 or the driving system therefor, such as the lift mechanism, from being destroyed by the shock generated during transport of the disc player 1. Moreover, sufficient strength may be assured since the reinforcement plate 165 mounted on the disc rotating operating mechanism 100 is inserted into the gap 160 and the first and second lugs 163, 164 are engaged in the cut-outs 158, 159.

Although the foregoing description has been directed to the disc player employing the optical disc as the recording medium, the present invention may be applied to, for example, a loading device employing a disc cartridge housing therein an optical disc, a magneto-optical disc or a magnetic disc, as a recording medium, with equal advantages.

The present invention may also be applied to a loading device employing a tape cassette housing therein a tape-shaped recording medium as a recording medium.

Industrial Applicability

The recording apparatus of the present invention, as described above, can sequentially record input information signals on plural recording mediums, as these recording mediums are exchanged, for continuously recording the input information signals for prolonged time. By using recordable disc-shaped recording mediums as the recording mediums, searching non-recorded vacant areas of the recording mediums based on the information concerning the recording contents, such as the TOC information, and by sequentially recording the signals in these vacant areas, continuous recording on plural recording mediums can be made without erasing the recorded information signals, even if the recording medium in use is used.

What is claimed is:

1. A loading apparatus for a recording medium, comprising:

a main body portion;

a plurality of transporting members arranged in a stacked state in the main body portion and adapted for movement between a position protruded from the main body portion and a position within the main body portion, the transporting members each carrying a recording medium thereon; and a movement mechanism including a first driving source, a first driving unit to which driving power from the first driving source is continually transmitted, and a second driving unit driven by a second driving source for being moved to selectively transmit the driving power from the first driving unit to the plurality of transporting members for moving one of the plurality of transporting members between the position protruded from the main body portion and the position within the main body portion;

the movement mechanism including a transmission switching mechanism for switchingly transmitting driving power from a third source to operate a clamp mechanism;

a detection mechanism for detecting a respective position of the plurality of transporting members, the plurality of transporting members being moved by the movement mechanism between the position protruded from the main body portion, the position within the main body portion, and/or a recording medium recording and/or reproducing position based on a detection result from the detection mechanism, wherein each of said plurality of transporting members includes a disc tray having a width smaller than an optical disc with cut-outs on opposite facing sides of the disc tray for reducing the size of the disc tray;

a plurality of rectangular openings in a front surface of the main body portion in parallel with one another for permitting one of the plurality of transporting members to be moved to the position protruded from te main body portion; and a plurality of lids for opening/closing the plurality of rectangular openings, the plurality of lids being rotatable towards a lower side of the main body portion and being arranged so that a portion of a given one of the lids is overlapped with a portion of an overlying one of the lids.

2. The loading apparatus as claimed in claim 1, wherein the first driving unit includes a plurality of gear portions selectively engaged with the plurality of transporting members, each of the plurality of transporting members having a mating engagement portion for respectively engaging with the plurality of gear portions.

3. The loading apparatus as claimed in claim 2, wherein the second driving unit includes a switching member for selectively engaging the plurality of gear portions of the first driving unit with the plurality of transporting members.

4. The loading apparatus as claimed in claim 3, wherein the switching member has an operating portion for engaging one of the plurality of gear portions with one of the plurality of transporting members, the operating portion causing the one of the plurality of gear portions to move into engagement with the one of the plurality of transporting members.

5. The loading apparatus as claimed in claim 2, further comprising:
   a recording and/or reproducing mechanism for recording an/or reproducing information signals to and/or from the switching member for selectively engaging the plurality of gear portions of the first driving unit with the plurality of transporting members.

6. The loading apparatus as claimed in claim 1, further comprising:
   a recording and/or reproducing mechanism for recording and/or reproducing information signals to and/or from the respective recording medium transported by the plurality of transporting members;
   a lift mechanism driven by the third driving source for moving the recording and/or reproducing mechanism to a recording and/or reproducing position; and
   a holding mechanism for holding the recording and/or reproducing mechanism during an off-time of a main power source of the loading apparatus at a position lowered by the lift mechanism.

7. The loading apparatus as claimed in claim 6, wherein the recording and/or reproducing mechanism includes an engagement member that is moved during the off-time of the main power source, and
   the holding mechanism has a stationary holding portion for engaging with the engagement member that is moved during the off-time of the main power source.

8. The loading apparatus as claimed in claim 1, wherein the disc tray included in each of the plurality of transporting members has a recess on which to set a recording medium and a first controlling portion for limiting movement of the recording medium set on the recess when the transporting member is moved towards the position within the main body portion, and
   a second controlling portion is provided on a lateral surface of the main body portion, for limiting movement of the recording medium set on the recess in a direction perpendicular to a direction of the position protruded from the main body portion and the position within the main body portion.

9. The loading apparatus as claimed in claim 8, further comprising a third controlling portion protruding from a top of the main body portion towards the recess in each said disc tray for limiting movement of the recording medium set on the recess in an up-and-down direction of the recording medium.

10. The loading apparatus as claimed in claim 1, wherein each of the plurality of lids is formed with an inclined surface at an overlapping portion thereof with the overlying lid.

11. The loading apparatus as claimed in claim 1, further comprising a biasing mechanism for biasing the plurality of lids in a direction to close the plurality of rectangular openings.

12. A loading apparatus for a recording medium, comprising:
   a transporting member on which a recording medium is set, the transporting member being moved between a position protruded from a main body portion of the apparatus and a position within the main body portion; and
   a movement mechanism for moving the transporting member between the position protruded from the main body portion and the position within the main body portion, the movement mechanism including a first driving source, a first driving portion to which driving power is continually transmitted from the first driving source, and a second driving portion driven by a second driving source for engaging the driving power from the first driving portion with the transporting member only when the transporting member is moved towards the position protruded from the main body portion or towards the position within the main body portion;
   the movement mechanism includes a transmission switching mechanism for switchingly transmitting driving over from a third driving source to operate a clamp mechanism;
   a detection mechanism for detecting a position of the transporting member, the transporting member being moved by the movement mechanism between the position protruded from the main body portion, the position within the main body portion, and/or a recording medium recording and/or reproducing position based on a detection result from the detection mechanism, wherein
   said transporting member includes a disc tray having a width smaller than an optical disc with cut-outs on opposite facing sides of the disc tray for reducing the size of the disc tray;
   a plurality of rectangular openings in a front surface of the main body portion in parallel with one another for permitting one of the plurality of transporting members to be moved to the position protruded from the main body portion; and
   a plurality of lids for opening/closing the plurality of rectangular openings, the plurality of lids being rotatable towards a lower side of the main body portion and being arranged so that a portion of a given one of the lids is overlapped with a portion of an overlying one of the lids.

13. The loading apparatus as claimed in claim 12, wherein the first driving portion includes a gear portion engaged with the transporting member and the transporting member is provided with a mating engagement portion for engaging with the gear portion.

14. The loading apparatus as claimed in claim 12, further comprising:
   a recording and/or reproducing mechanism for recording and/or reproducing information signals to and/or from the recording medium transported by the transporting member, and
   a lift mechanism driven by the third driving source for moving the recording and/or reproducing mechanism to a recording and/or reproducing position when the detection mechanism detects the transporting member to be in a recording and/or reproducing position.

15. The loading apparatus as claimed in claim 12, further comprising:
   a recording and/or reproducing mechanism for recording and/or reproducing information signals to and/or from the recording medium transported by the transporting member;

a lift mechanism driven by the third driving source for moving the recording and/or reproducing mechanism to the recording and/or reproducing position; and a holding mechanism for holding the recording and/or reproducing mechanism during an off-time of a main power source of the apparatus at a position lowered by the lift mechanism.

16. The loading apparatus as claimed in claim 15, wherein the recording and/or reproducing mechanism includes an engagement member which is moved during the off-time of the main power source, and the holding mechanism has a stationary holding portion for engaging with the engagement member which is moved during the off-time of the main power source.

17. A loading apparatus for a recording medium, comprising:

a plurality of transporting members arranged in a stacked state in a main body portion of the apparatus and adapted for being moved between a position protruded from the main body portion and a position within the main body portion, the plurality of transporting members each carrying a recording medium thereon, wherein the main body portion has a plurality of rectangular-shaped openings in a front surface thereof in parallel to one another through which said plurality of transporting members respectively move;

a movement mechanism including a first driving source, a first driving unit to which driving power from the first driving source is supplied, a second driving source, and a second driving unit driven by the second driving source for selectively transmitting the driving power from the first driving unit to the plurality of transporting members for moving one of the plurality of transporting members between the position protruded from the main body portion and position within the main body portion;

a recording and/or reproducing mechanism for recording and/or reproducing information signals to and/or from a recording medium transported by one of the plurality of transporting members;

a lift mechanism driven by a third driving source for moving the recording and/or reproducing mechanism to a recording and/or reproducing position; and a holding mechanism for holding the recording and/or reproducing mechanism during an off-time of a main power source of the apparatus at a position lowered by the lift mechanism, wherein the movement mechanism includes a transmission switching mechanism for switchingly transmitting a driving power from the third driving source to operate a clamp mechanism; and a plurality of lids for opening/closing the openings, the lids being rotatable to a lower side of the main body portion, the lids being arranged so that portions of a given one of the lids overlap with portions of an overlying one of the lids.

18. The loading apparatus as claimed in claim 17, wherein the recording and/or reproducing mechanism includes an engagement member which is moved during the off-time of the main power source, and the holding mechanism has a stationary holding portion for engaging with the engagement member which is moved during the off-time of the main power source.

19. The loading apparatus as claimed in claim 17, further comprising a detection mechanism for detecting respective positions of the plurality of transporting members, the plurality of transporting members being respectively moved by the movement mechanism between the position protruded from the main body portion and the position within the main body portion based on detection results from the detection mechanism.

20. The loading apparatus as claimed in claim 19, wherein the lift mechanism moves the recording and/or reproducing mechanism to the recording and/or reproducing position when the detection mechanism detects one of the plurality of transporting members to be in the recording and/or reproducing position.

21. The loading apparatus as claimed in claim 17, wherein the portions of the one lid overlapping with the overlying one of the lids are formed with inclined surfaces.

22. The loading apparatus as claimed in claim 17, further comprising a biasing mechanism for biasing the lids in a direction to close the openings.

* * * * *